(12) United States Patent
Hara et al.

(10) Patent No.: US 8,280,975 B2
(45) Date of Patent: Oct. 2, 2012

(54) IMAGE SUPPLY APPARATUS AND IMAGING APPARATUS, AN INFORMATION PROCESSING APPARATUS AND CONTROL METHOD THEREOF, AND COMMUNICATION SYSTEM

(75) Inventors: Kenichiroh Hara, Yokohama (JP); Takashi Mizuno, Ohta-ku (JP); Takashi Aizawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1427 days.

(21) Appl. No.: 11/572,395

(22) PCT Filed: Sep. 15, 2005

(86) PCT No.: PCT/JP2005/017427
§ 371 (c)(1),
(2), (4) Date: Jan. 19, 2007

(87) PCT Pub. No.: WO2006/030962
PCT Pub. Date: Mar. 23, 2006

(65) Prior Publication Data
US 2007/0260809 A1    Nov. 8, 2007

(30) Foreign Application Priority Data

Sep. 16, 2004 (JP) ................................. 2004-270084
Sep. 17, 2004 (JP) ................................. 2004-272525

(51) Int. Cl.
G06F 15/167     (2006.01)
(52) U.S. Cl. ........ 709/216; 709/212; 709/229; 709/232; 709/245; 709/248

(58) Field of Classification Search .................. 709/212, 709/216, 229, 232, 245, 203, 217, 230, 248
See application file for complete search history.

(56) References Cited

U.S. PATENT DOCUMENTS

| | | | | |
|---|---|---|---|---|
| 5,805,821 A | * | 9/1998 | Saxena et al. | 709/231 |
| 6,192,191 B1 | | 2/2001 | Suga et al. | 386/120 |
| 6,407,680 B1 | * | 6/2002 | Lai et al. | 341/50 |
| 6,408,344 B1 | * | 6/2002 | Sakai | 710/20 |

(Continued)

FOREIGN PATENT DOCUMENTS

JP          09-98367          4/1997

(Continued)

OTHER PUBLICATIONS

Official Letter/Search Report, dated Jun. 15, 2009, issued by the European Patent Office, in European Patent Application No. 05785824.3.

*Primary Examiner* — Michael Won
(74) *Attorney, Agent, or Firm* — Fitzpatrick, Cella, Harper & Scinto

(57) ABSTRACT

When there are very many images stored in a memory card, a time after a computer and a digital camera have been logically connected with each other until the computer and the camera answers a user becomes extremely long. When the digital camera caches the information of a file stored in a storage medium by accessing the storage medium in a reproduction mode, and when the digital camera and the computer are physically connected to each other and they are in a communication mode, information which the computer appears to request finally is generated and stored. After that, when the digital camera receives a data transfer request from the computer, the digital camera transmits stored information to the computer in a lump.

8 Claims, 16 Drawing Sheets

U.S. PATENT DOCUMENTS

| | | | |
|---|---|---|---|
| 6,784,925 B1 | 8/2004 | Tomat et al. | 348/207.11 |
| 7,032,003 B1 * | 4/2006 | Shi et al. | 709/203 |
| 7,139,811 B2 * | 11/2006 | Lev Ran et al. | 709/217 |
| 7,165,224 B2 * | 1/2007 | Pyhalammi | 715/748 |
| 7,467,195 B2 * | 12/2008 | Motoyama et al. | 709/223 |
| 7,512,673 B2 * | 3/2009 | Miloushev et al. | 709/221 |
| 7,706,637 B2 * | 4/2010 | Marriott | 382/305 |
| 7,730,155 B1 * | 6/2010 | Meyer et al. | 709/217 |
| 7,730,159 B1 * | 6/2010 | Meyer et al. | 709/217 |
| 7,765,277 B1 * | 7/2010 | Meyer et al. | 709/217 |
| 7,779,097 B2 * | 8/2010 | Lamkin et al. | 709/223 |
| 7,821,663 B2 * | 10/2010 | Yamada et al. | 358/1.15 |
| 7,899,915 B2 * | 3/2011 | Reisman | 709/228 |
| 2003/0079038 A1 * | 4/2003 | Robbin et al. | 709/232 |
| 2004/0056846 A1 | 3/2004 | Aizawa | |
| 2004/0109062 A1 | 6/2004 | Yamaya | 348/207.1 |
| 2006/0068910 A1 * | 3/2006 | Schmidt et al. | 463/40 |
| 2006/0284982 A1 * | 12/2006 | Bigioi et al. | 348/207.1 |
| 2007/0073937 A1 * | 3/2007 | Feinberg et al. | 710/62 |
| 2007/0103553 A1 * | 5/2007 | Hara | 348/207.1 |
| 2007/0283046 A1 * | 12/2007 | Dietrich et al. | 709/245 |

FOREIGN PATENT DOCUMENTS

| | | |
|---|---|---|
| JP | 09-114724 | 5/1997 |
| JP | 9-305473 | 11/1997 |
| JP | 11-355706 | 12/1999 |
| JP | 2001-128111 | 5/2001 |
| JP | 2002-369106 | 12/2002 |
| JP | 2004-112078 | 4/2004 |
| KR | 2003-0009514 A | 1/2003 |
| WO | WO 02-84999 A1 | 3/2002 |

* cited by examiner

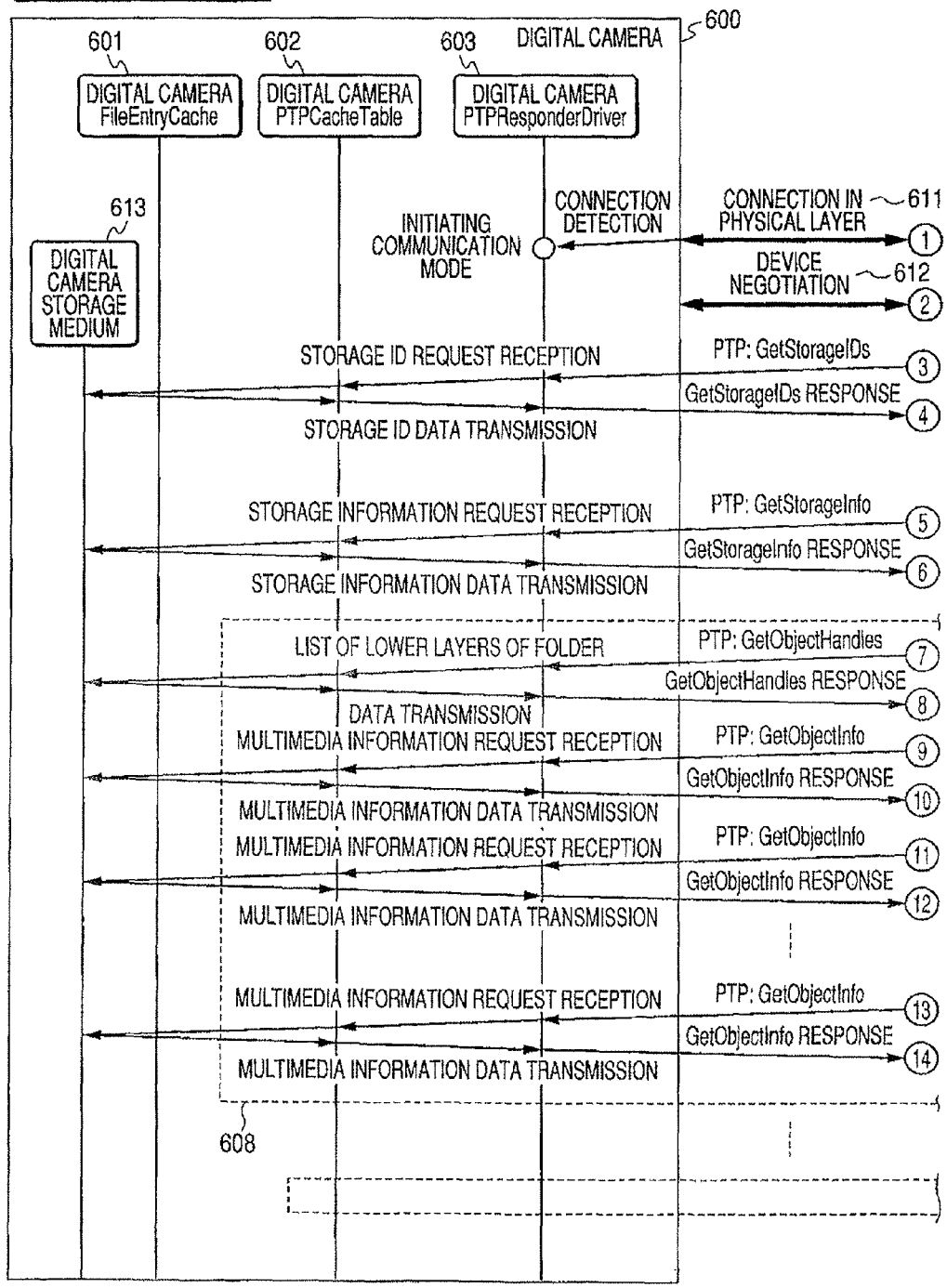

| FIG. 6A | FIG. 6B |

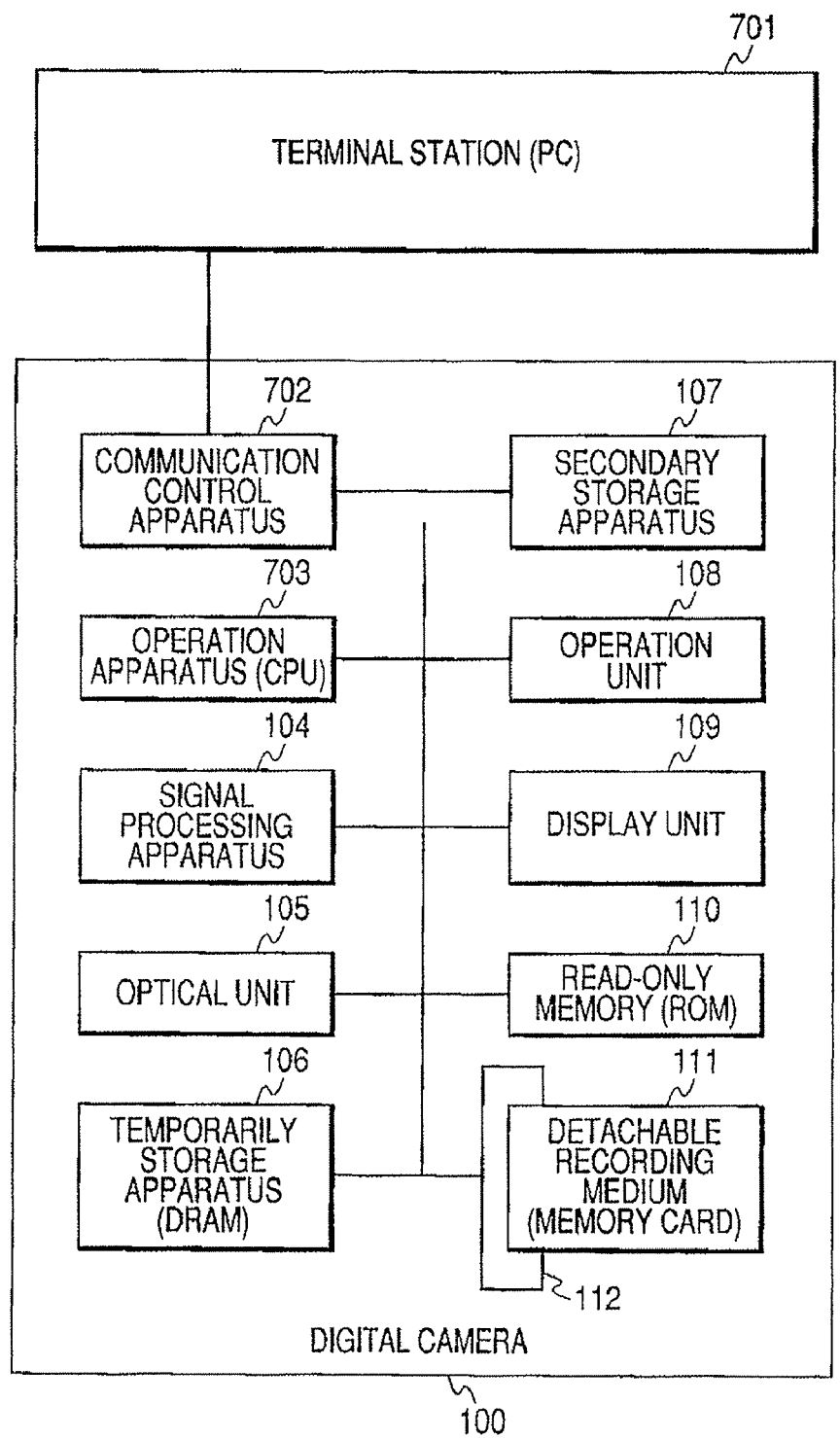

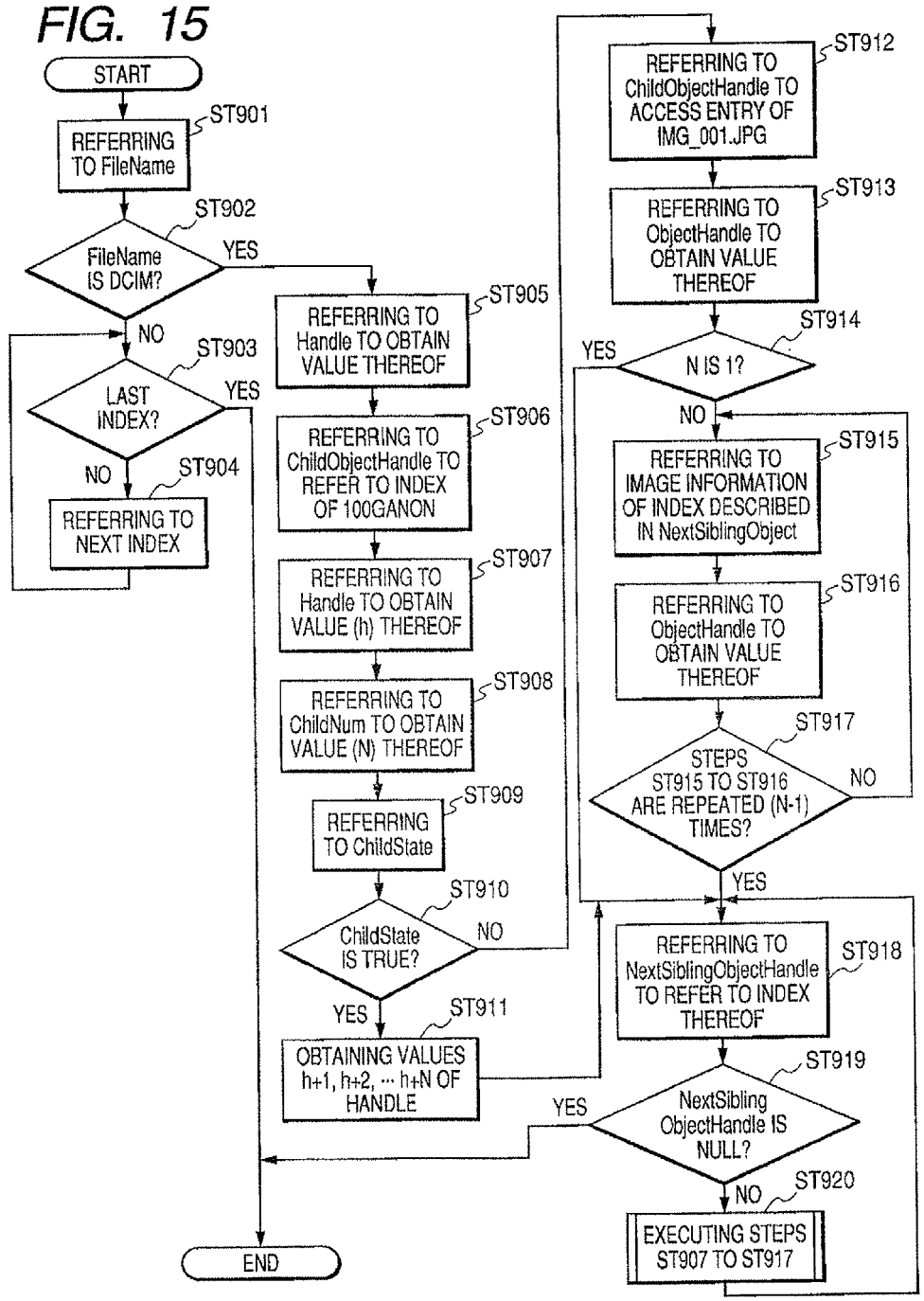

IMAGE SUPPLY APPARATUS AND IMAGING APPARATUS, AN INFORMATION PROCESSING APPARATUS AND CONTROL METHOD THEREOF, AND COMMUNICATION SYSTEM

TECHNICAL FIELD

The present invention relates to an image supply apparatus and an imaging apparatus, an information processing apparatus, a control method thereof, and a communication system, wherein the image supply apparatus and the imaging apparatus perform communication with an information processing apparatus based on a communication protocol called as Picture Transfer Protocol (PTP) to supply the information on stored objects to the information processing apparatus.

BACKGROUND ART

Universal Serial Bus (USB) is known as a standard of communication between an information terminal such as a computer and an imaging apparatus. Moreover, recently, Picture Transfer Protocol (PTP) has been proposed by Photographic and Imaging Manufactures Association, INC. (PIMA) as a communication standard in an upper layer of USB which has been created based on a still image rank interface of USB.

The standard regulates a data transfer system for a digital camera, a scanner and the like. By the standard, a user can easily load a data file of a pick-up or scanned image into a personal computer without being conscious of a directory structure in which an image file is stored. When a computer and a digital camera are connected to each other and they mutually exchange data based on a communication protocol PTP, in order that a computer may obtain the information of one stored object (data such as an image, a sound, and a text), the computer first transmits GetObjectInfo. After that, the computer executes one sequence of receiving Object data and receiving Ack.

Hereupon, the information obtainable by GetObjectInfo is not the object itself, but the attribute information of the object such as the file name thereof, the file size thereof, the directory structure thereof, and the type of a file thereof can be obtained. That is, in order to obtain the data of a certain object, obtaining the attribute information obtained by GetObjectInfo and obtaining the data body thereafter are performed.

On the other hand, when a plurality of objects of a storage medium is exchanged, the OS of the computer requests the attribute information relative to the data stored in the storage medium and the information of the folder structure at first in order to know the folder structure of the storage medium held by the digital camera.

Consequently, in order to obtain the attribute information relative to all the objects of the data such as images and sounds stored in the digital camera, exchanges of the above-mentioned command are to be executed over again for the number of the stored objects (see Japanese Patent Laid-Open Publication No. 2004-15234).

As described above, in order that the OS of the computer may obtain the information of all the images stored in the digital camera using PTP, it is necessary to perform the communication mentioned above for at least the number of the stored images.

That is, it is found that the time necessary for obtaining the information of all the images that the digital camera stores is simply proportional to the number of the stored images.

In particular, on the image reception side (for example, the PC), if the transmission and the reception of data on PTP cannot be performed until the image receiving side has obtained the information such as the attribute information and has reproduced the folder structure thereof, the time taken until the image receiving side reproduces the folder structure and the directory structure becomes long.

That is, when a large-capacity memory card is installed in the digital camera and the number of the images and the other objects stored in the memory card is very large, the time until a response to a user is initiated after the computer and the digital camera have been logically connected becomes extremely long. For this reason, usability becomes bad and this has been also the weak point of the communication of PTP.

DISCLOSURE OF THE INVENTION

The present invention has been made in view of the above-mentioned conventional problem. It is an object of the present invention to provide an image supply apparatus, an imaging apparatus, an information processing apparatus, a control method of them, and a communication system, which solve the problem.

It is another object of the present invention is to provide an image supply apparatus, an imaging apparatus, an information processing apparatus, a control method of them, and a communication system, which can shorten the time necessary for the operations (reading, deletion, obtainment of information, and the like) of an object recorded on a recording medium in the imaging apparatus.

In order to attain the above-mentioned objects, according to one aspect of the present invention, an imaging apparatus of the present invention is an imaging apparatus for communicating with an information processing apparatus to transfer file information stored in a storage medium connected to the information processing apparatus, and comprises cache means for caching a file entry of a file stored in the storage medium in a cache memory, interface means for connecting the imaging apparatus with the information processing apparatus in a state capable of performing communication by a predetermined communication protocol, transfer information generation means for generating information to be transferred by the predetermined communication protocol, on the basis of the file entry cached by the cache means in response to connection by the interface means, and transmission control means for controlling the interface means to transmit the information generated by the transfer information generation means to the information processing apparatus in response to a request from the information processing apparatus.

According to another aspect of the present invention, an image supply apparatus of the present invention is an image supply apparatus for specifying image files stored in a storage medium using a unique number assigned to each file one by one and effecting communication by using a communication protocol capable of transmission of attribute information included in each of the image files, and comprises cache means for caching at least a part of the attribute information and the number assigned to each of the image files with regard to the plurality of image files stored in the storage medium when the image files stored in the storage medium are reproduced, interface means for connecting the image supply apparatus with an information processing apparatus, and transmission means for transmitting the information cached by the cache means to the information processing apparatus in response to connection with the information processing apparatus with the interface means.

According to a further aspect of the present invention, an information processing apparatus of the present invention is an information processing apparatus for specifying image files stored in a storage medium connected to an image supply apparatus using a unique number assigned to each of the files one by one and effecting communication by using a communication protocol capable of obtainment of attribute information included in each of the image files, and comprises interface means for connecting the information processing apparatus with the image supply apparatus, reception means for receiving information including at least a part of the attribute information of the plurality of image files stored in the storage medium and the number assigned to each of the image files in response to connection with the image supply apparatus through the interface means, and transmission means for transmitting a transmission request of an image to the image supply apparatus using the number assigned to each of the plurality of images, included in the information received by the reception means.

According to a still further aspect of the present invention, a communication system of the present invention is a communication system for performing communication between an information processing apparatus and an imaging apparatus to transfer file information stored in a storage medium of the imaging apparatus to the information processing apparatus, wherein the imaging apparatus includes cache means for caching file entries of all files stored in the storage medium in a cache memory, interface means for connecting the imaging apparatus with the information processing apparatus in a state capable of performing the communication by a predetermined communication protocol, transfer information generation means for generating information to be transferred by the predetermined communication protocol, on the basis of the file entries cached by the cache means in response to connection by the interface means, and transmission control means for controlling the interface means to transmit the information generated by the transfer information generation means to the information processing apparatus in response to a request from the information processing apparatus, and the information processing apparatus includes data request means for requesting the file information stored in the storage medium in response to the connection by the interface means.

The other objects and configurations of the present invention will be clear from the following descriptions with reference to the attached drawings.

BRIEF DESCRIPTION OF THE DRAWINGS

FIG. 7 is a diagram showing an example of the configuration of the hardware of a digital camera according to a second embodiment of the present invention, and a state of connection of the digital camera with a PC;

FIG. 15 is a flowchart illustrating the processing of obtaining all the object handles in storage in the second embodiment.

BEST MODE FOR CARRYING OUT THE INVENTION

First Embodiment

With reference to the attached drawings, the preferred embodiments of the present invention are described in detail below.

Incidentally, in the present embodiment, descriptions are given to an example in which a digital camera and a computer are connected to each other with a general purpose interface such as USB and the digital camera and the computer communicate with each other by PTP. However, the interface, the communication protocol and the like of the present invention are not limited to those of the present embodiment.

Figure 1:
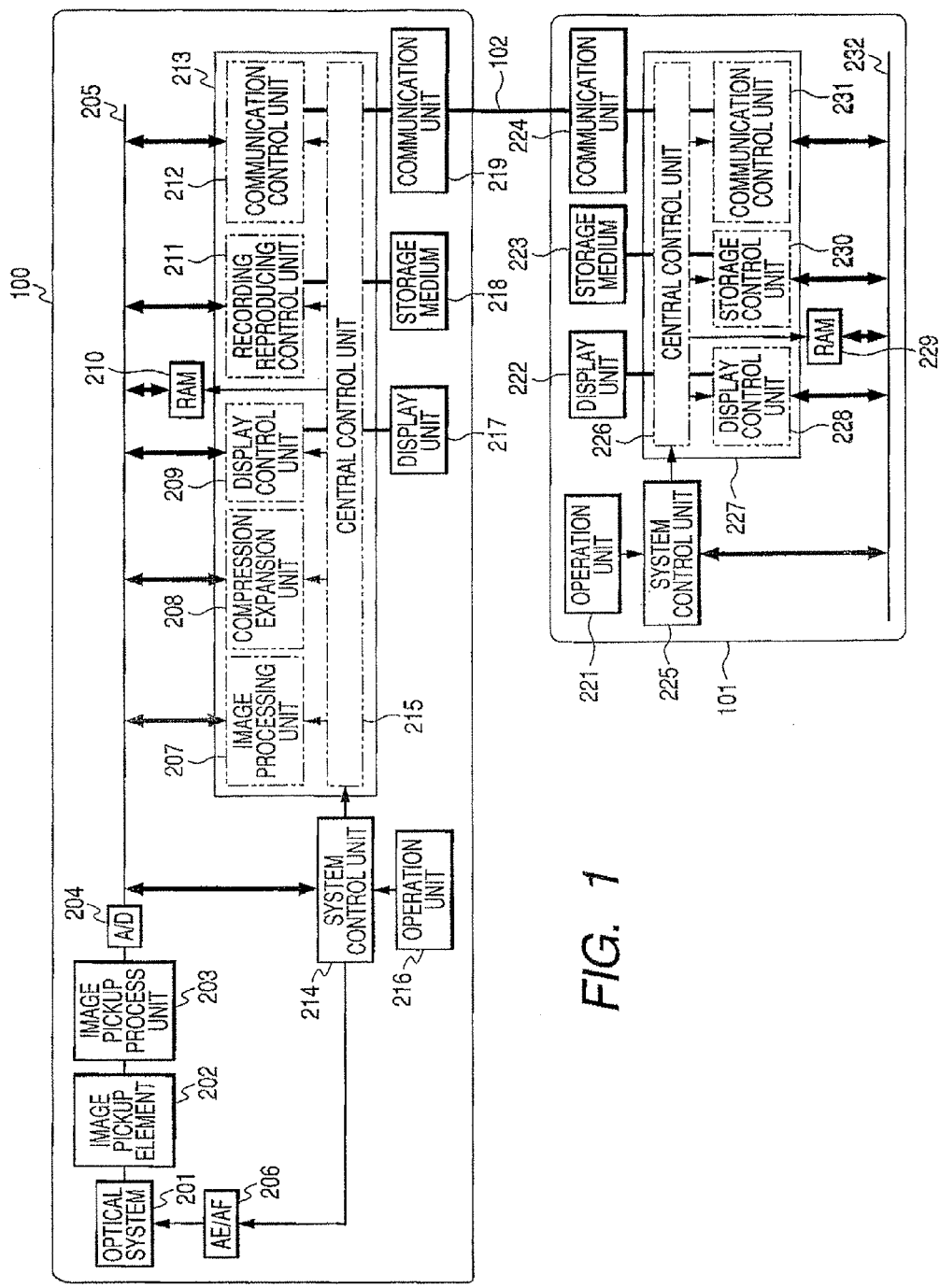
FIG. 1 is a block diagram showing the configuration of a system including a digital camera (DSC) and a computer according to the present embodiment.

FIG. 1 is a block diagram showing the configuration of a system which has a digital camera (DSC) and a computer according to the present embodiment. A digital camera 100 which has PTP communication and a computer 101 which can perform the PTP communication are connected through a general purpose interface 102 (for example, USB). The general purpose interface 102 is a communication interface capable of performing communication by PTP, and is not limited to a wired communication interface. A wireless communication interface such as Bluetooth may be adopted.

When the digital camera 100 detects the connection with the computer 101 through the communication interface 102, the digital camera 100 transits to a communication mode. The mode before the transition in the digital camera 100 is set as a reproduction mode. Incidentally, an application (including an OS function) which can perform communication by PTP is installed in the computer 101.

The configuration of the digital camera 100 is first described.

A light flux from a subject irradiates an image pickup element 202 through an optical system 201, and the image is held as electric charges in the image pickup element 202. In this way, the electric charges stored in the image pickup element 202 are converted into an image signal by the image pickup process unit 203. The image signal output from the image pickup process unit 203 is converted into a digital signal by an A/D converter 204, and is saved by a RAM 210 through a data bus 205.

A central processing process part 213 includes an image processing unit 207 (white balance, sharpness, degrading, color balance, level correction and the like), a compression expansion unit 208 (expansion of JPEG, and the like), a display control unit 209 (the rendering of a user interface (UI) to a display unit 217), a recording reproducing control unit 211 (I/O control to a storage medium 218), the communication control unit 212 (I/O control of the data to a communication unit 219), and a central control unit (CPU) 215 (performing the integrated control of each control unit).

A system control unit 214 is connected with the data bus 205, and performs control based on the operations performed by a user with an operation unit 216. The display unit 217 displays the images requested by the operations of the user under the control of the display control unit 209. The storage medium 218 stores the images (such as JPEG images) saved at the RAM 210, through the recording reproducing control unit 211.

The storage medium 218 may be also either of a storage medium detachable to the camera body (for example, memory card or the like) and a storage medium incorporated into the camera body. The storage medium 218 is a nonvolatile storage medium capable of holding memory even in a state in which no power source is injected to the digital camera 100. The communication unit 219 may be either of wireless one and wired one, and may be either of detachable one and undetachable one to the main body. The communication control unit 212 can perform the communication of PTP.

Next, the configuration of the computer 101 is described.

An operation unit 221 of the computer 101 includes a keyboard, a mouse, and the like for performing the control based on operations by a system control unit 225. A display unit 222 is a monitor for a display, and outputs a UI and the like rendered by a display control unit 228. A RAM 229 is a volatile memory (for example, DRAM) storing the OS of the computer 101, the applications (including the OS) compatible with PTP, and the like.

A storage media 223 is an apparatus (for example, a hard disk or the like) performing input and output in response to a data request by a storage control unit 230, and is a nonvolatile storage device. The applications compatible with the OS or PTP are stored in the storage medium 223. A communication unit 224 is a communication unit connectable with the communication interface 102, and performs the input and output of data by a communication control unit 231. The communication unit 224 may either of wireless one and wired one, and it does not matter whether the communication unit 224 may be detachable or undetachable.

A central processing process part 227 includes the display control unit 228, the storage control unit 230, the communication control unit 231, and a central control unit 226 (CPU performing integrated control of each control unit and the like). A data bus 232 is connected with the system control unit 225, the display control unit 228, the RAM 229, the storage control unit 230, and the communication control unit 231.

Figure 2:
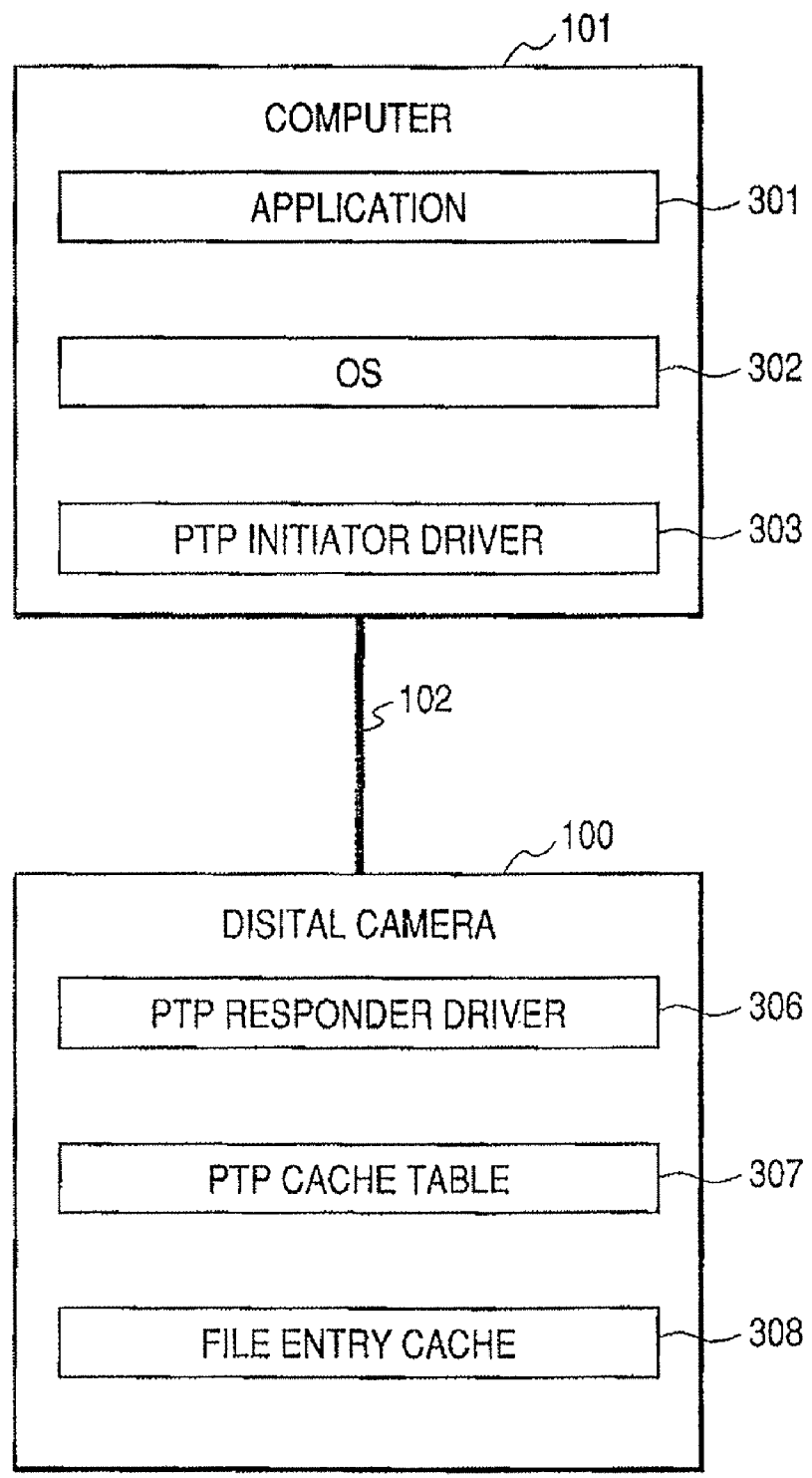
FIG. 2 is a block diagram showing the configuration of the modules becoming main ones when the digital camera and the computer according to the present embodiment are connected through a communication interface.

FIG. 2 is a block diagram showing the module configuration which becomes main ones when the digital camera 100 and the computer 101 according to the present embodiment are connected through the communication interface 102.

The computer 101 is first described.

An application 301 is an application for notifying the user of the connection of the digital camera 100. The application 301 is registered in an OS 302 in advance, and the application 301 may be one initiated automatically. Alternatively, the application 301 may be one initiated by an operation of the user. In the present embodiment, the application 301 is supposed to be one initiated by the OS 302's detection of the connection of the digital camera 100. The OS 302 is the operating system of the computer 101, and is supposed to be one having a function capable of interpreting PTP communication like Windows® of Microsoft Corporation or Macintosh® of Apple Computer, Inc., or one capable of interpreting PTP communication by installing a driver. A PTP initiator driver (PTPInitiatorDriver) 303 (hereinafter referred to as PTP initiation driver) is an initiator driver of PTP installed in the OS 302.

Next, the modules of the digital camera 100 are described.

A PTP responder driver (PTPResponderDriver) 306 (hereinafter referred to as a PTP response driver) is supposed to be a response driver of PTP incorporated in the digital camera 100.

A PTP cache table (PTPCacheTable) 307 (hereinafter referred to as a PTP cache table) caches the once used contents requested by a PTP operation, and responds at a high speed using the cached contents when the same request is made again. The structure of the cache does not matter here. A file entry cache (FileEntryCache) 308 (hereinafter referred to as a file cache) caches the entry information of a file. This is on the supposition that the cache of file information is used as one means when the digital camera 100 displays the image stored in the storage medium 218 on the display unit 217 in a preview mode. At least a part of many pieces of the attribute information of each file is copied in the file cache 308; for example, a file size, a file attribute, a file creation date, a file update date, a file access date and time, a file name, and the like are written in the file cache 308.

An object of the present embodiment is to shorten a time from the start of the connection of the digital camera 100 and the computer 101 to each other until the OS 302 starts some action to the application 301. The application 301 is the application compatible with PTP, and is initiated from the OS 302 or by an operation of the user. If the OS 302 has established the connection with the digital camera 100, the application 301 can access the digital camera 100. The OS 302 is the operating system loaded in the computer 101. The OS 302 recognizes a device which can communicate by PTP, and obtains the information of the image stored in the storage medium 218 of the digital camera 100 using the driver 303. After having obtained all information, the OS 302 is changed into the state where the camera 100 is connectable, and can deliver a device handle in response to the request from the application 301.

In the present embodiment, after having obtained all information, the OS 302 is set to initialize the application 301 automatically. The PTP initiation driver 303 is a driver capable of performing a PTP connection with the digital camera 100, and is loaded to the RAM 229 by a request of the OS 302 to be initiated. The communication interface 102 is a communication interface capable of performing the PTP communication, and the communication interface 102 does not matter whether it is wired or whether it is wireless, and further does not matter whether it is detachable or whether it is undetachable, as long as it can perform the PTP communication.

The digital camera 100 is a digital camera capable of performing the PTP communication, and includes the PTP response driver 306, the cache table 307, and the file cache 308 therein. The PTP response driver 306 has a function of behaving as a responder of PTP.

The cache table 307 is a cache table for caching an item required for PTP, and an image file having been once used can be obtained by referring to the cache table 307 as long as the consistency of the cache is insured. Consequently, it is possible to read a file at a higher speed by far than to access the storage medium 218 directly to read the image file for the analysis of the file.

The file cache 308 caches the information of a file, namely the items to be written in file entry information such as a file name, a file size, an attribute, a creation date and a time, and an update time. Thereby, similarly to the cache table 307, the information of these files can be referred to as long as the consistency of the cache is insured. Consequently, the speeding up of access is realizable.

Figure 3:
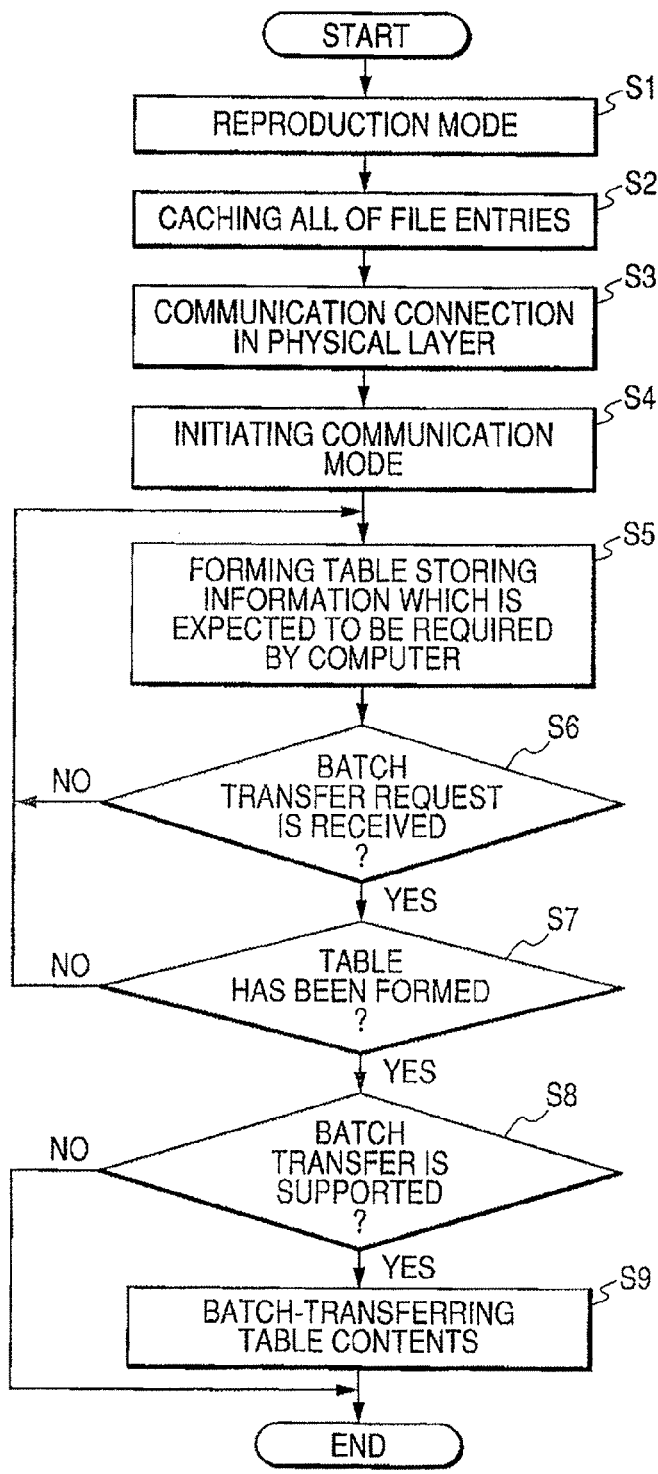
FIG. 3 is a flowchart showing the processing executed by the digital camera according to the present embodiment from a time when the digital camera is connected to the computer through the communication interface to a time when an OS performs an initiation notification to an application.

FIG. 3 is a flowchart showing the processing which the digital camera 100 according to the present embodiment executes after the digital camera 100 has been connected with the computer 101 through the communication interface 102 until the OS 302 performs an initiation notification to the application 301. The processing is started by the turning-on of the power source of the digital camera 100 and the initiation thereof by the turning-on. First, at Step S1, the initiation is performed in a reproduction mode.

Next, at Step S2, the file entries of all of the image files stored in the storage medium 218 are cached in the file cache 308. At this time, the order of the files to be cached does not matter.

Next, at Step S3, the digital camera 100 is connected with the computer 101 through the communication interface 102. At this time, by a physical layer, the digital camera 100 detects that communication became possible, and shifts to the communication mode at Step S4.

In this way, when the digital camera 100 has shifted to the communication mode, at Step S5, the digital camera 100 creates a folder structure of the storage medium 218 on the basis of the information cached in the file cache 308 (which has been cached at Step S2). At this time, the digital camera 100 creates the table in consideration of the file information which is expected to be required by the OS 302 of the computer 101 and the folder structure which the OS 302 requires. The table is described in detail on and after a second embodiment. Hereupon, based on the information cached in the file cache 308, the digital camera 100 creates the information of a file which the OS 302 requires. For this reason, the cache table 307 can be created without accessing the storage medium 218 here.

Thereby, the time taken until the user can perform some action to the computer 101 after the digital camera 100 and the computer 101 have been connected to each other is shortened. Furthermore, the object handle and an object Format-Code for the transmission by PTP are also created at the same time.

The object handle is a number uniquely assigned to each object such as an image file and a sound file in the storage medium, and the PC and the digital camera can perform to specify an image file and the like using the number (handle).

In a usual PTP, using the handle, in order to investigate what kind of file each object is, the attribute information, at least a part of data (a file name, a file size, and the like), and a directory structure are asked for every object. Apart from this timing, the digital camera 100 receives an inquiry from the computer 101 about whether the digital camera 100 supports a batch transfer operation, which is an expanded operation of PTP, or not. In processing of the present embodiment, when the digital camera 100 receives GetDeviceInfo, the digital camera 100 responds to that command with the data indicating that the digital camera 100 deals with the support of the batch transfer operation if the digital camera 100 supports the batch transfer operation.

After that, at Step S6, when a request of a batch transfer is issued from the computer 101, the processing of the digital camera 100 progresses to Step S7, and the digital camera 100 investigates whether the table creation processing of Step S5 has been completed or not. When the table creation processing has not been completed, the processing of the digital camera 100 returns to Step S5, and executes the processing mentioned above.

On the other hand, when the table creation processing has been completed, the processing of the digital camera 100 progresses to Step S8, and whether the batch transfer is supported or not is investigated. When the batch transfer is supported, at Step S9, the digital camera 100 performs the batch transfer based on the table created at Step S5.

At Step S9, the digital camera 100 transfers the information of all the files in the cache table 307 (a file name, a file size, a file attribute, a file stamp, an object handle, an object Format-Code, and the information indicating the parent and child relationship of a folder).

At this time, while there is a method of delivering the cache table 307 by size fixation, a transmission in a variable-length size, which delivers only the size for the number of PTP objects, is also considerable.

Incidentally, although batch transfer processing is shown to be once performed at Step S9 of the flowchart, it is not known what data size the computer 101 receives when the data size the batch transfer of which is performed is variable length. Consequently, the computer 101 may inquire of the digital camera 100 about the data size in advance. Moreover, the structures filled in the cache table 307 may be made to have redundancy in order to be changed according to an expanded operation or a change of the information requested by the OS 302.

Because all the information stored in the storage medium 218 can be transferred by about several timed of communication even if the points mentioned above are considered, the overhead of communication becomes smaller by far than that in the case where every piece of information of the storage medium 218 is transferred one by one, and speeding up can be realized.

Figure 4:
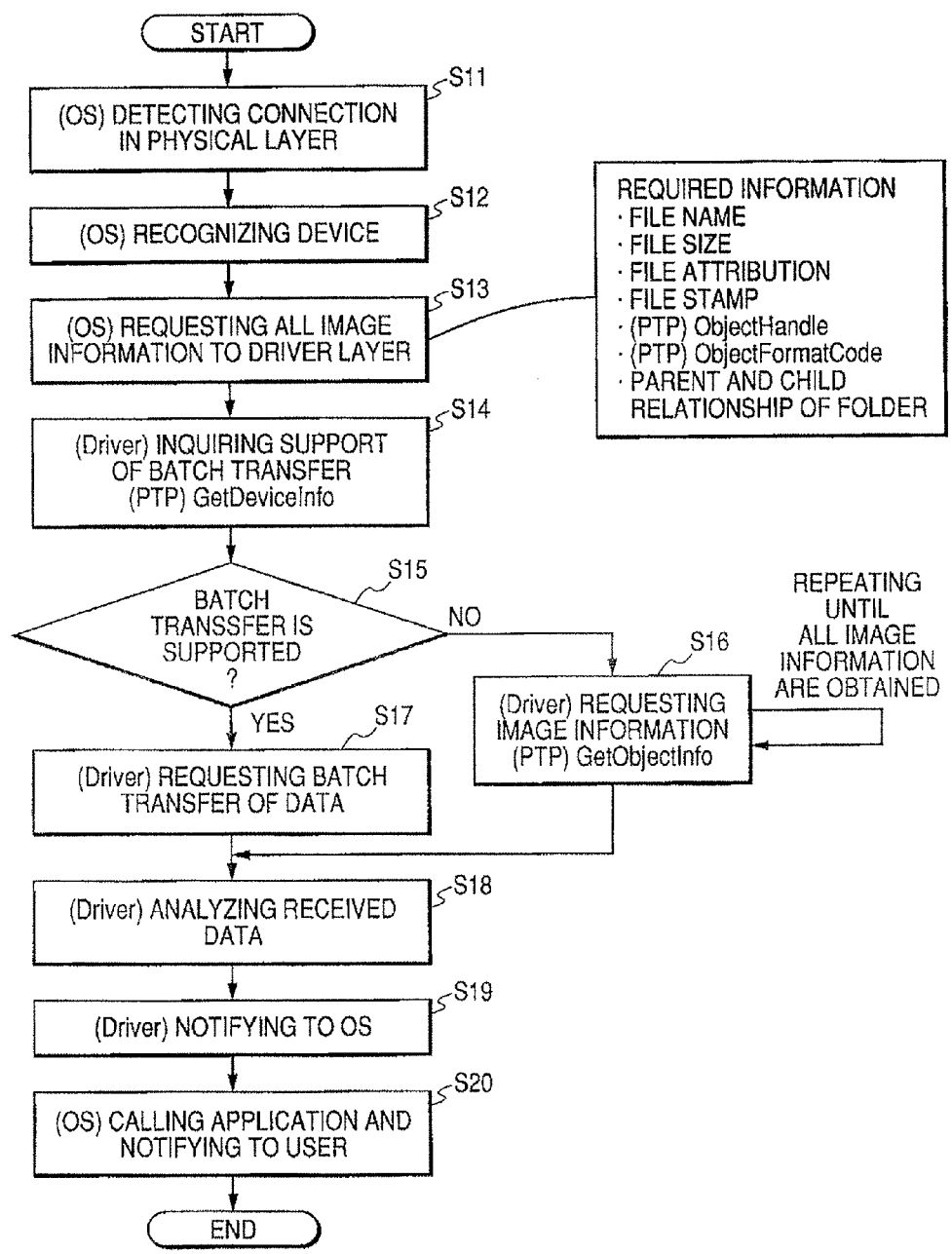
FIG. 4 is a flowchart illustrating processing by the computer according to the present embodiment.

FIG. 4 is a flowchart illustrating the processing by the computer 101 according to the present embodiment. Hereupon, FIG. 4 shows the processing which the computer executes during a period of time from detecting the connection with the digital camera 100 through the communication interface 102 until the OS 302 notifies the application 301 of initialization.

At Step S11, the computer 101 detects the connection with the camera 100 in the physical layer by the connection through the communication interface 102.

Next, at Step S12, the OS 302 recognizes the connected device based on the data relative to the past connection of the connected device. At this stage, it is premised that the digital camera 100 compatible with PTP was connected at least once in the past, and the driver is installed.

Next, at Step S13, the OS 302 requests the all pieces of the information stored by the digital camera 100 and the folder structure thereof from the PTP initiation driver 303. What is requested here is a part of many pieces of attribute information included in each file such as a file name, a file size, a file attribute and a file creation date; a PTP object handle; a PTP object FormatCode; and a folder structure of the form which the OS 302 requires.

The PTP initiation driver 303, which has received the request of the OS 302, inquires of the digital camera 100 about whether the batch transfer is supported or not, at Step S14. As the inquiry command, for example, "GetDeviceInfo" of PTP and the like can be cited.

When the batch transfer is supported, the processing of the computer 101 progresses to Step S17, and the PTP initiation driver 303 requests the batch transfer of data from the digital camera 100.

Herewith, the digital camera 100 receives the request of the batch transfer of data at Step S6 of FIG. 3, and responds to the request by performing the batch transfer of the contents of the tables at Step S9.

Herewith, the computer 101 receives the data from the digital camera 100 and analyzes the data, at Step S18. Next, at Step 19, the PTP initiation driver 303 analyzes the data corresponding to the form which the OS 302 requires, on the basis of the received data, and responds to the OS 302.

Next, at step 20, the OS 302 initiates the application 301 in the state in which the device handle sent in response to the request of the data transfer which the OS 302 performed to the PTP initiation driver 303 can be used. In this way, when the application 301 is initiated, the information of the storage medium 218 of the connected digital camera 100 is notified to the user.

On the other hand, when the computer 101 judges that the batch transfer is not supported at Step S15, the processing of the computer 101 progresses to Step S16, and the PTP initiation driver 303 needs to obtain the information stored in the storage medium 218 of the digital camera 100 using "GetStorageIDs", "GetStorageInfo", "GetObjectHandles", "GetObjectInfo" and the like of PTP operations. After that, the processing of the computer 101 progresses to Step S18, and the above-mentioned processing is executed.

Figure 5B:
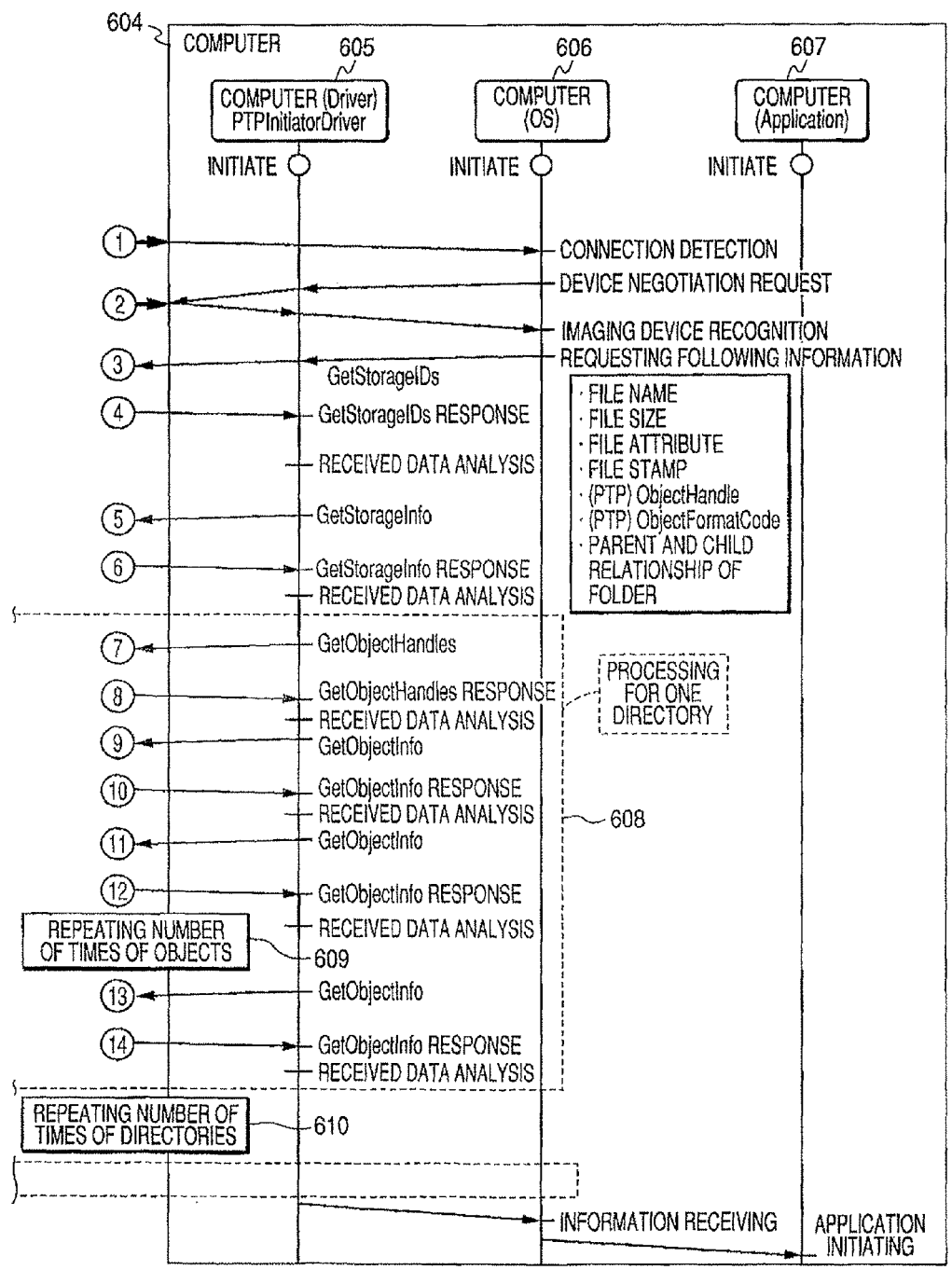
FIG. 5 is comprised of FIGS. 5A and 5B showing diagrams illustrating sequences from a time when a conventional digital camera and a computer are connected to each other to a time when an OS initiates an application.

FIGS. 5A and 5B are diagrams illustrating sequences to be performed until a conventional digital camera and a computer are connected and the OS initiates an application.

It is supposed that a digital camera 600 and a computer 604 are severally initiated, and that the connection of them is made by the connection in a physical layer 611. The digital camera 600 has been initiated as a reproduction mode at a stage before the connection, and has cached all pieces of the file entry information of the information in a storage medium to a file cache (FileEntryCache) 601. The cache information includes a file name, a file size, a file attribute, a file creation date and time, and the like. In this way, when the connection in the physical layer 611 is made, in the digital camera 600, the connection is detected by a communication control unit, and a communication mode is initiated. In the computer 604, the OS detects the connection, and initiates a negotiation with a device (612).

Next, the OS of the computer (606) recognizes the camera 600, and requests the information of the camera 600 to the PTP initiation driver (PTPInitiatorDriver) 605. What are requested here are a file name, a file size, a file attribute, a file stamp, an object handle of the PTP format, an object FormatCode of the same, and the folder structure thereof.

The PTP initiation driver (PTPInitiator) 605, which has received the request of the OS 606, obtains the ID of the storage medium (StorageID) of the digital camera 600 using "GetStorageIDs" in response to the request. Next, the PTP initiation driver 605 obtains the information of the storage medium of the digital camera 600 using "GetStorageInfo."

Next, the PTP initiation driver 605 lists object handles using "GetObjectHandle", and repeats "GetObjectInfo" to the object handles located at a lower layers one by one (608). The combination of "GetObjectHandle" and "GetObjectInfo" is processing per one directory, and repeats the processing for the number of the directories (610).

In this way, after having repeated the combination of the commands for the number of the directories, the PTP initiation driver 605 obtains all the pieces of information of the storage medium of the digital camera 600, and creates the information in the format of the information which the OS has requested, and responds to the OS.

The OS 606 obtains the information of the PTP initiation driver 605, and initiates an application 607. On the other hand, in the digital camera 600, whenever a PTP operation comes, the digital camera 600 caches the PTP operation in a cache table (PTPCacheTable) 602, and accesses the storage medium 613 of the digital camera 600. Then, the digital camera 600 executes procedures of the interpretation by a PTP response driver (PTPResponseDriver) and the response to the computer 604.

Here, it is usually only once that the OS 606 of the computer 604 tries to obtain all of the pieces of information in the storage medium. Therefore, even if caching is carried out to the cache table (PTPCacheTable), the OS may not again access the cache memory at the usual communication between the computer 604 and the digital camera 600. Consequently, the effects by the cache memory are little.

On the contrary, a time necessary for the transfer of all pieces of information becomes longer as the number of files becomes larger when the exchange of commands of PTP communication and data transfer processing are performed every access to the storage medium 613. That is, in the PTP communication, as the number of the object handles becomes larger, the number of times of communication increases by the increased number of the object handles. Consequently, the time required to obtain all of the pieces of information becomes longer in simple proportion.

That is, the overhead of communication becomes larger as the number of files becomes larger, and that causes the lowering of a speed. For example, when the connection times of the digital camera in which 50 images are stored in the storage medium thereof and the digital camera in which 3000 images are stored in the storage medium thereof are compared, the latter is 60 times of the former in single proportion.

In addition, because the digital camera 600 accesses the storage medium 613 repeatedly, it is known that the time is elongated by the order of several digits even if it is compared with the access speed to the RAM.

Figures 6, 6A:
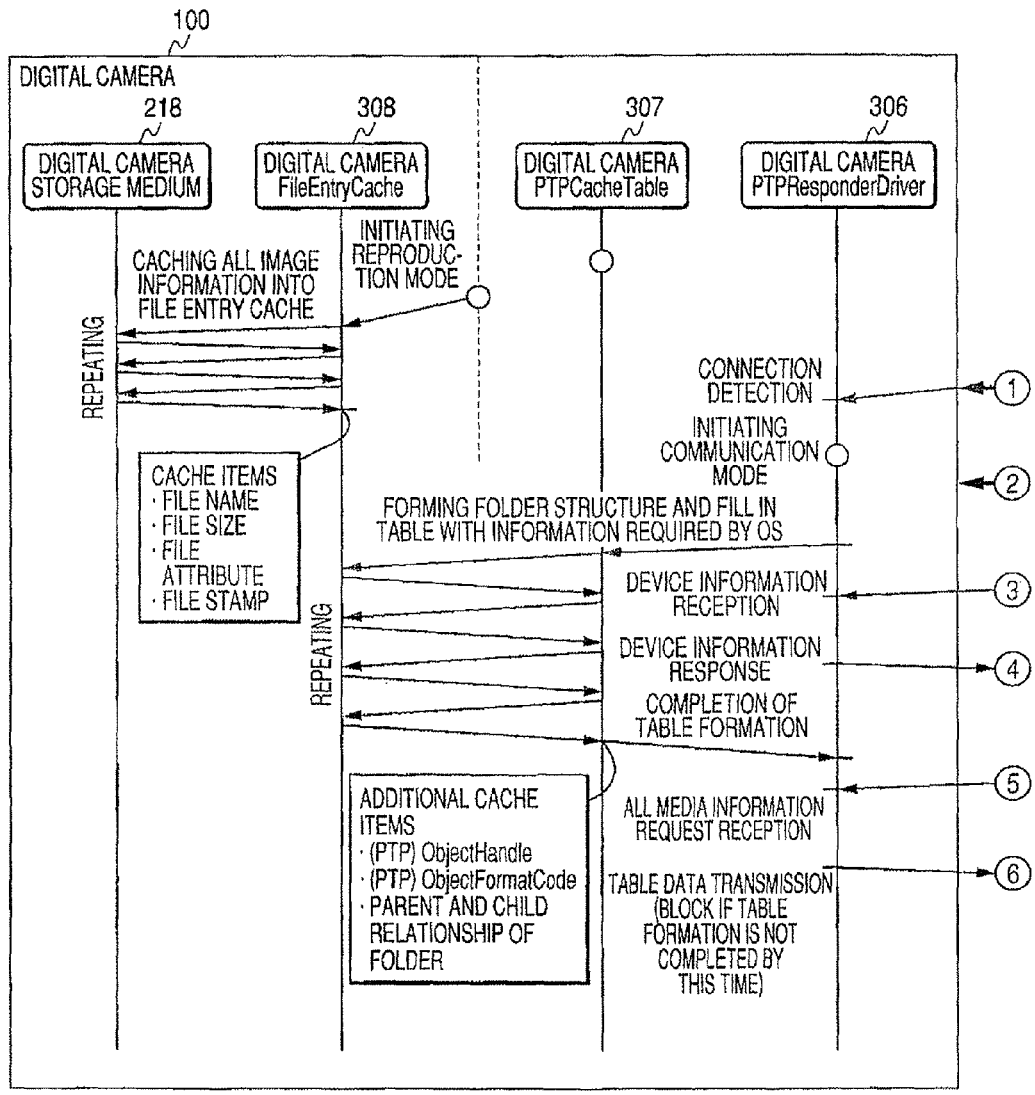
FIG. 6 is comprised of FIGS. 6A and 6B showing diagrams illustrating the sequences of the operations from a time when the digital camera and the computer according to the present embodiment are connected to each other and the OS of the computer initiates the application.
Figure 6B:
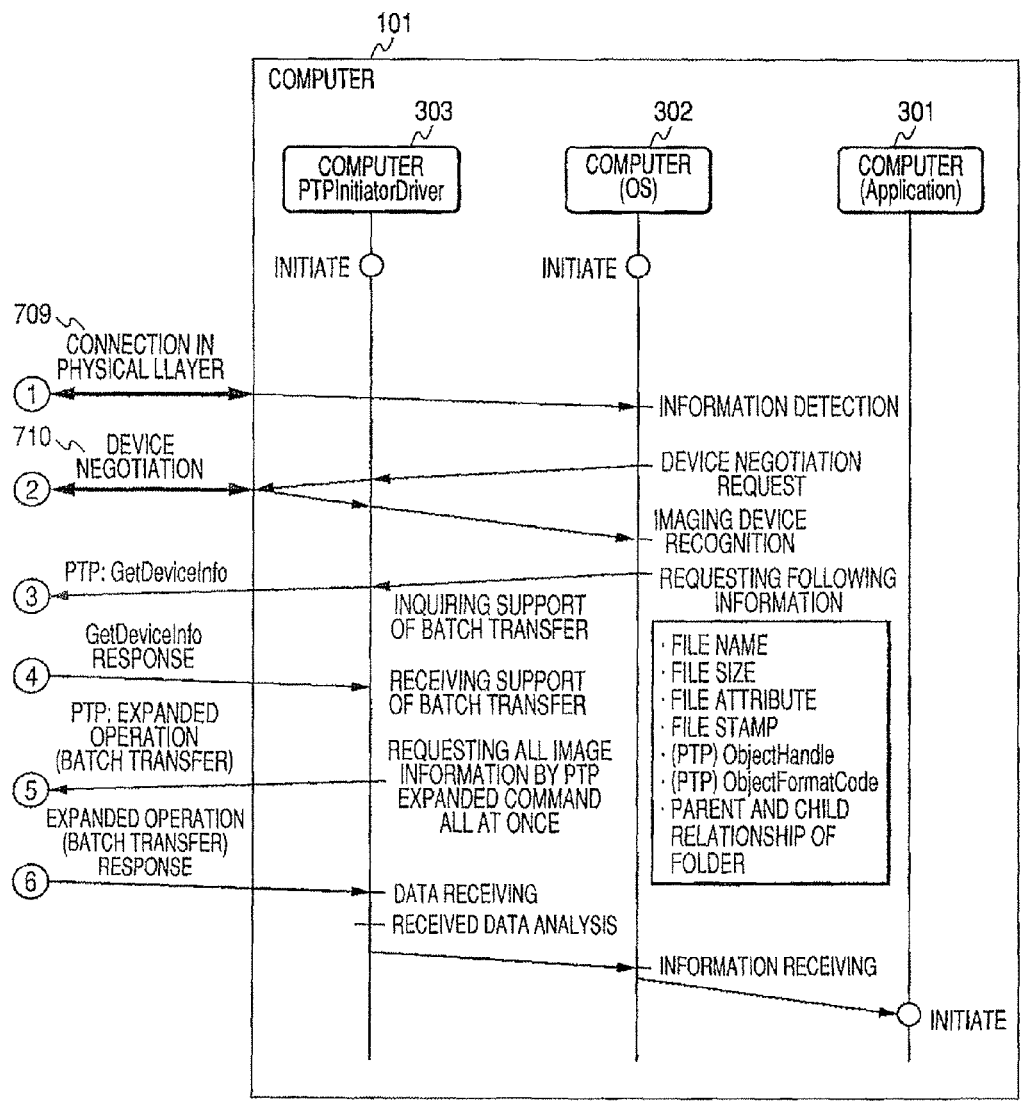

FIGS. 6A and 6B are diagrams illustrating operation sequences from a time when the digital camera 100 and the computer 101 according to the present embodiment are connected to each other to a time when the OS 302 of the computer 101 initiates the application 301. The diagram is one corresponding to the module configuration of FIG. 2.

When the connection of the physical layer is made with the communication interface 102 (709), the digital camera 100 and the computer 101 detects the connection.

The digital camera 100 shifts into the reproduction mode once before of after the connection of the physical layer is made (the mode before the communication mode is surely the reproduction mode).

In this reproduction mode, the information of all the files in the storage medium 218 is cached by being written in the file cache 308. The cache items created here are a file name, a file size, a file attribute, and a file creation date and time, and there are especially no regulations to the order of file caches.

After that, when the communication mode is initiated, in the communication mode, another thread is booted at the time of the initiation, and the information which the OS 302 requests is created in the cache table 307 in advance.

Hereupon, the information is created based on the information in the file cache 308, and the information necessary for PTP is also created. Here, because the information of all the files of the storage medium 218 has been already cached in the file cache 308, the information which the OS 302 requests is created in the cache table 307 without accessing the storage medium 218.

Therefore, as for the speed at this time, it is possible to create the cache table 307 at a high speed in the order of several digits compared with the sequences shown in FIGS. 5A and 5B. While the other thread is initiated, in the computer 101, after the connection of the physical layer (709), the OS 302 detects the connection and starts a negotiation with the digital camera 100 (710). After the end of the negotiation, the OS 302 recognizes the digital camera 100, and requests the information of the device of the PTP initiation driver 303. What are requested here are a file name, a file size, a file attribute, a file creation date and time, an object handle of PTP, an object FormatCode of PTP, and information indicating the configuration of a folder. The PTP initiation driver 303 receiving the request of the OS 302 issues a "GetDeviceInfo" command to inquire the digital camera 100 in order to discriminates whether the digital camera 100 supports the batch transfer of data or not.

The PTP response driver 306 of the digital camera 100, which has received that command, answers to the command. Here, it is supposed that the PTP response drive 306 answers to the command that the PTP response driver 306 supports the batch transfer. Thereby, the PTP initiation driver 303 of the computer 101 requests a batch transfer of data as an expanded operation of PTP next.

Thereby, when the digital camera 100 receives the request of the batch transfer of data, the digital camera 100 judges whether the cache table 307 is in the state capable of answering the request or not. When the cache table 307 is in the state capable of answering the request, the digital camera 100 gives a prompt answer of being OK. When the state is not so, the digital camera 100 stands by until the creation processing of the cache table 307 is completed.

Incidentally, although the concern relative to whether a block time-out is performed or not here can be considered, because the cache table 307 is created without accessing the storage medium 218 in fact, the processing is carried out at a high speed. Therefore, even if a number of files equivalent to the number of the maximum objects which the digital camera 100 supports were stored in the storage medium 218, it would be thought to be impossible that a block timeout would occur.

Moreover, the computer may be designed in order that even if a block timeout occurred and causes an error, the PTP initiation driver 303 of the computer 101 might perform retrying again.

In this way, when the PTP initiation driver 303 of the computer 101 receives a response to the request, the PTP initiation driver 303 analyzes the data of the received cache table 307, and changes the structure of the data into the one which the OS 302 requests, to responds to the OS 302. Thereby, the OS 302 initiates the application 301 after receiving the data.

Thereby, the application 301 or the CPU 226 can analyze the received information for a greatly shorter time than that of the conventional technique, and can recognize the information such as the directory structure and the folder structure in the storage medium of the digital camera and a file name.

Moreover, based on the received handle (number), the application 301 or the CPU 226 can transmit a transmission request such as desired image data to the digital camera through the communication interface. The analysis of the data can be performed by the discrimination of the kind of analysis by the computer 101, and the computer 101 can answer to the OS 302 according to the analysis.

Moreover, a method in which the computer 101 performs an inquiry to the digital camera 100 by a PTP expanded operation in order that the computer 101 may discriminate the kind of the data analysis is also considerable. Thereby, because the access to the storage medium 218 in the digital camera 100 is performed as a batch access to all objects when the digital camera 100 initiates in the reproduction mode, the access is processed at a high speed also during the communication with the computer 101.

Moreover, by adopting the batch transfer of data, the communication can be performed only by a several times of communication (two times of ObjectInfo of cached data and the object itself at the lowest) irrespective of the number of image files.

Thereby, when 50 image files are stored in the storage medium 218 of the digital camera 100, or even when 3000 image files are stored therein, the data transfer can be carried out by the same number of times of communication.

Incidentally, when an object about which a cache table has been created is divisionally transmitted and received, the number of times of communication can be increased to, for example, 3 or 4 times dependently of the way thereof. Also in such a case, the effect of improvement in the speed can be sufficiently obtained.

The feature of the present embodiment lies in the point that the digital camera 100 recognizes in advance the information assumed to be requested by the OS 302 of the computer 101.

Moreover, the feature also lies in that the digital camera 100 uses all of the cache information to be used in the reproduction mode and the digital camera 100 prepares the data to be transferred to the computer 101, in a separated thread before the digital camera 100 is called from the PTP initiation driver 303 of the computer 101. Incidentally, because the cache data is the cached data which is to be transmitted from the first, the cache hit ratio thereof is 100%.

Because, according to such a present embodiment, no accesses to the storage medium occur in the digital camera during a time from the connection in the physical layer between the computer and the digital camera to the initiation of the application of the computer and processing therefore can be performed only by the accessing to the internal memory (RAM) of the digital camera 100, the digital camera 100 can answer at a high speed.

According to the present invention, a time after an imaging apparatus and an information processing apparatus are connected to the performance of answering the user of the information processing apparatus can be shortened. Moreover, when the information of the file stored in the storage medium of the imaging apparatus is requested from the information processing apparatus, it is possible to respond the request rapidly to transmit the information to the information processing thereof.

Second Embodiment

FIG. 7 shows an example of the configuration of a digital camera 700 as an imaging apparatus according to a second embodiment. Moreover, FIG. 7 shows a state of connecting a personal computer (PC) 701 as an external information terminal (hereinafter sometimes referred to simply as "terminal station") capable of performing communication with the digital camera 700 to the digital camera (hereinafter simply referred to as "camera") 700.

The digital camera 700 includes a communication control apparatus 702 for performing communication with the terminal station 701, an operation apparatus (CPU) 703 performing the operation control of the whole of the digital camera 700, and a signal processing apparatus 704 performing processing such as the compression coding, the edge enhancement and the noise removal of a photographed image.

Furthermore, the digital camera 700 includes an optical unit 705 containing a lens and a motor for performing the drive of auto-focus and zooming, a temporary storage apparatus (DRAM) 706 used as a temporary storage region of the CPU 703, and a secondary storage apparatus 707 being a nonvolatile storage apparatus such as a flash memory®.

Moreover, the digital camera 700 includes an operation unit 708, such as a cursor key, a setting/execution button, and a menu key, for a user to give various instructions to the digital camera 700, a display unit 709 represented by an LCD, and a read-only memory (ROM) 710 storing control programs, which the CPU 703 executes.

Moreover, the digital camera 700 includes a detachable recording medium 711 represented by a memory card, and its read-write apparatus (such as a card reader writer and an optical drive) 712.

Incidentally, in the present embodiment, it is supposed that the digital camera 700 and the terminal station 701 are connected by the USB interface, and that the communication in conformity with PTP, i.e., the communication using the commands in conformity with PTP, is performed.

However, the digital camera 700 and the terminal station 701 may be connected by a connection method other than the USB. In concrete terms, a wired connection represented by IEEE 1394 and a wireless connection represented by Bluetooth and IEEE 802.11x can be used. Incidentally, as described above, there are standard commands and vendor expanded commands as the commands in conformity with PTP.

Description of TreeDataTable

Figure 8:
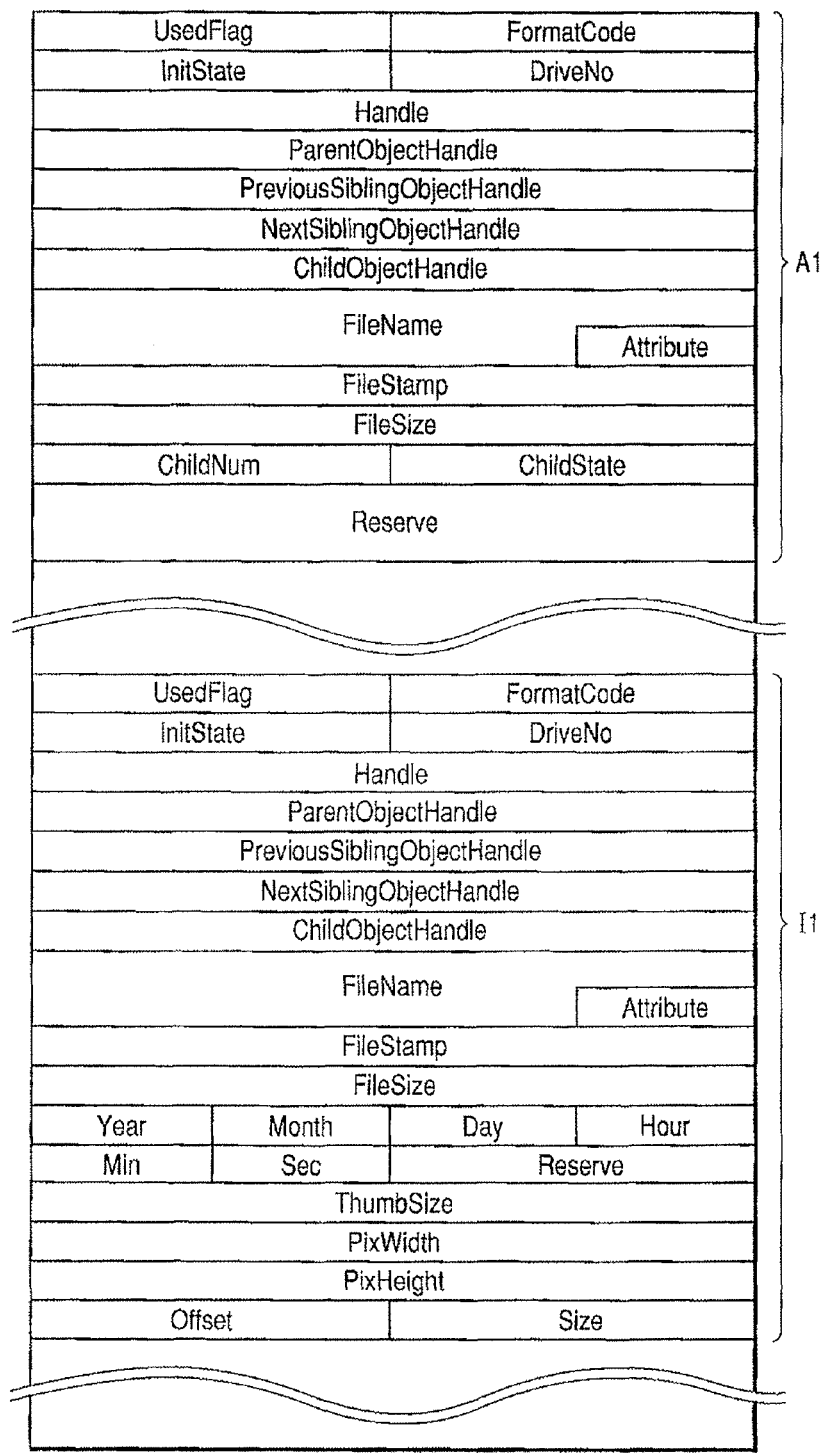
FIG. 8 is a diagram showing the data structure of TreeDataTable which, the digital camera according to the second embodiment of the present invention generates.

FIG. 8 is a view showing the structure of TreeDataTable which the digital camera 700 of the present embodiment creates in the temporary storage apparatus 706 at the time of a communication beginning with the PC 701.

Henceforth, although the technology relative to a table is described as the second embodiment, the second embodiment shows the details of the processing of the first embodiment, FIG. 3, and Step S5.

TreeDataTable is a table for recording the object information (file information, directory information) recorded in the camera. The size of the table is fixed. TreeDataTable is recoded per Association information or image information, each having a fixed size and corresponding to one object. Therefore, the number of objects which can be stored in one table is fixed. As mentioned above, TreeDataTable is composed of the Association information which is the information relative to the objects other than images such as a folder, and the image information in which the information relative to an image object is recorded.

In FIG. 8, A1 and I1 are exemplified as examples of the Association information and the image information, respectively. Incidentally, in TreeDataTable, the order of storing the Association information and the image information is arbitrary.

Next, each field of the Association information is described. A field UsedFlag is a flag indicating whether object information is effective or not. UsedFlag takes, for example, a true value (TRUE) in the initial state (effective state), and is rewritten to an invalid state (FALSE) when a corresponding object is deleted.

The format of the object information (the information enabling to discriminate between the Association information and the image information; for example a value indicates the kind (JPEG, GIF, bmp, or the like) of the object in case of image information) is stored in a field FormatCode. A field InitState shows the state of object information.

At a time point when communication with the PC 701 has been begun and TreeDataTable has been created, the digital camera 700 is in a folder structuring state. And, when the digital camera 700 tries to obtain object information for the first time in response to the PTP command from the PC 701, the field InitState becomes an object information-minute-recording state, and a part of the filed of image information is recorded in TreeDataTable.

As mentioned later, the folder structuring state is a state in which the information relative to a parent object, a top child object, and an object of the same rank is recorded in TreeDataTable at the time of a communication beginning with the terminal station. The object information-minute-recording state is a state in which the information relative to the object such as the update date and time and the file size is recorded in TreeDataTable by referring to the header of an object.

A field DriveNo shows the number of volume. A field Handle is a handle (object handle) to this object, and it is equal to the index number of TreeDataTable, as it will be mentioned later. A field ParentObjectHandle is a handle to a parent object (the value of the object handle corresponding to the parent object, i.e. the index number).

A field PreviousSiblingObjectHandle is a handle to the preceding object in the same hierarchy layer. A field NextSiblingObjectHandle is a handle to the next object in the same hierarchy layer. A field ChildObjecthandle is a handle to a top child object. By these four fields, the reproduction and the grasp of the hierarchical structure of an object are possible.

A field FileName is an object name. A character string in conformity with the DCF protocol enters the field FileName, and the characters are set to be less than 13 characters. A field Attribute indicates an attribute (such as an access right) of a file. A field FileStamp indicates the update date and time of a file. A field FileSize is the size of a file, and is the size of the whole object containing a header. A field ChildNum is the number of child objects. A field ChildState indicates whether the object handles of child objects are consecutive numbers or not. A field Reserve is a reserved area.

Next, each field of the image information of TreeDataTable is described.

The fields UsedFlag, FomatCode, InitState, DriveNo, Handle, ParentObjectHandle, PreviousSiblingObjectHandle, nextSiblingObjectHandle, ChildObjectHandle, FileName, Attribute, FileStamp, and FileSize are used for the respectively same uses as the same name fields of the Association information.

Fields Year, Month, Day, Hour, Min, and Sec are used in order to indicate photography date and time (a year, a moon, a day, a time, a minute, and a second). ThumbSize is the data size of a thumbnail image. PixWidth is the number of pixels of the present image data in its horizontal direction, and PixHeight is the number of pixels in its vertical direction. Offset is a value (a byte count) which indicates a position where the present image data begins in an image file object including thumbnail image data and the present image data. Size is the data size of the present image. Reserve is a reserved area.

Incidentally, in the present embodiment, TreeDataTable is created in order that the value stored in the field Handle (object handle) of Association information and image information may become equal to the index number in TreeDataTable.

That is, the field Handle of the Association information and the image information which constitutes TreeDataTable is equal to the value indicating the existing position of the object information in TreeDataTable.

As mentioned above, the Association information and the image information have the same fixed size (for example, it is supposed to be n bytes). Consequently, when it is supposed that the object handles (index numbers) are integers which begin from one, the starting position of the object information of an object handled (an index number) a in TreeDataTable can be immediately obtained as a (n×a+1)th byte.

Therefore, when retrieval by a PTP command using an object handle is requested, the Association information or the image information for the retrieval can be immediately read, and improvement in the speed of retrieval is realized.

Generation Processing of TreeDataTable

Figure 9:
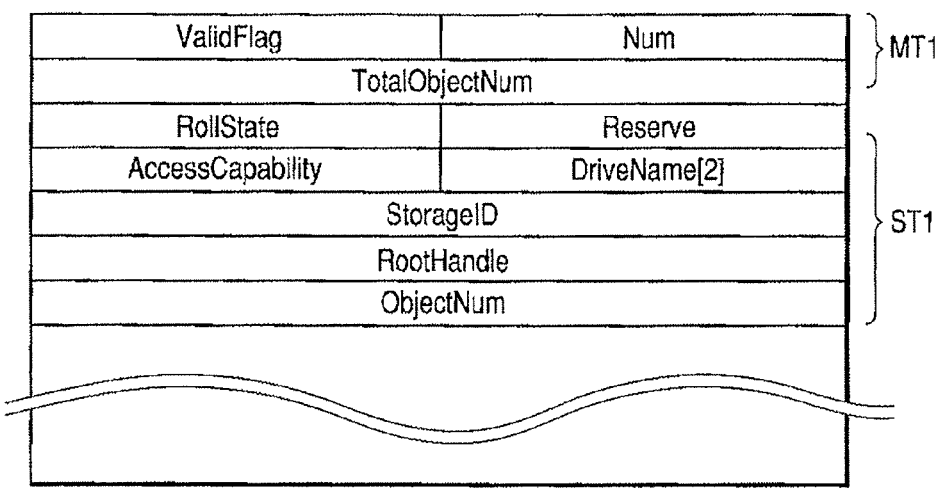
FIG. 9 is a diagram showing the data structure of StorageInfoTable which a digital camera according to a third embodiment of the present invention generates.

FIG. 9 is a view showing an example of the logical hierarchical structure of the objects recorded in the storage medium 711 or the secondary storage apparatus 707 in the digital camera 700.

Incidentally, in the following description, although it is supposed that an image object is recorded on the detachable storage medium 711, even if the image object is recorded in the undetachable secondary storage apparatus 707, the operation thereof is the same. In the state in which such a recording medium 711 is installed, a user connects the digital camera 700 and the PC 701 through a wired interface such as USB and IEEE 1394, or a wireless interface such as Bleutooth, as shown in FIG. 7. Thereby, communication between the digital camera 700 and the terminal station 701 starts.

Figure 14:
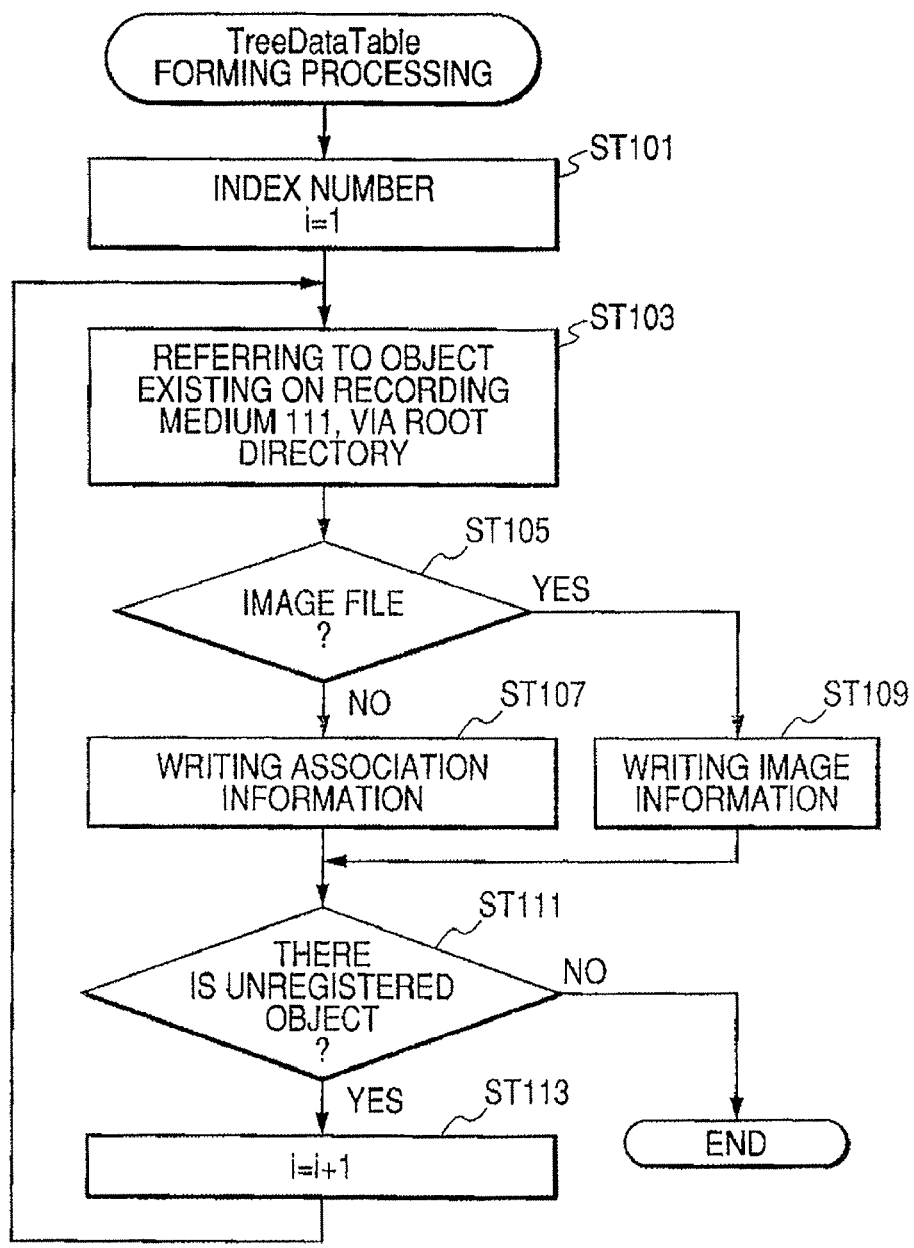
FIG. 14 is a flowchart illustrating the processing of creating TreeDataTable in the second embodiment.

By the start of the communicative, the CPU 703 generates TreeDataTable in a predetermined area of the temporary storage apparatus 706 while referring to the contents of the recording medium 711. In the following, using the flowchart of FIG. 14, the generation of TreeDataTable, and writing processing is described.

First, the CPU 703 initializes the index number i to one (Step ST101). And, referring to the recording medium 711, the CPU 703 refers to the recording medium 711 sequentially in the order from the rank below a root directory D. Then, the CPU 703 first refers to a folder "DCIM", and judges whether the object is an image object or not (Step ST105).

Because "DCIM" is a folder, the processing of the CPU 703 progresses to Step ST107, and the CPU 703 records the object information (Association information) of the folder "DCIM" in each field shown in FIG. 8.

Incidentally, in the discrimination method at Step ST105, because the folder name and the hierarchical structure which are generated into the recording medium 711 of the digital camera 700 are defined by standards, the CPU 703 can discriminate a folder and a image file in the hierarchical structure in the recording medium 711, for example, by the number of the rank order of the file from the root directory D.

When the CPU 703 writes the object information of "DCIM" into TreeDataTable, the CPU 703 increments the index number by one at Step ST111, and the processing of the CPU 703 returns to Step ST103. Incidentally, the object information of the folder "DCIM" is Association information including InitState being a folder structuring state, Handle=1, FileName="DCIM", ChildNum=1, and ChildObjectHandle=2.

Then, next, the information of the folder "100GANON" which exists in the rank under "DCIM" by one is recorded in TreeDataTable as Association information as object information including Handle=2. The object information of the folder "100GANON" is the Association information including InitState being a folder structuring state, Handle=2, ParentObjectHandle=1, NextSiblingObjectHandle=6, ChildObjectHandle=3, FileName="100GANON", and ChildNum=3.

Next, image object "IMG_0001.JPG" which exists in the rank under the folder "100GANON" is processed as the object information which has Handle=3. Because "IMG_0001.JPG" is an image object, the processing of the CPU 703 progresses to Step ST109 from Step ST105, and the object information is recorded as the image information.

However, at this time point, because the InitState state is the folder structure, CPU 307 performs writing into the fields from the top UsedFlag to FileSize among each field shown in FIG. 8, and does not write anything in the fields on and after a field Year. The object information of the image object "IMG_0001.JPG" is the image information including InitState being in the folder structuring state, Handle=3, ParentObjectHandle=2, NextSiblingObjectHandle=4, ChildObjectHandle=NULL, and FileName="IMG_0001.JPG."

Similarly, the object information of an image object "IMG_0002.JPG" is recorded next as the object information including Handle=4. The object information of the image object "IMG_0002.JPG" is the image information including InitState being in the folder structuring state, Handle=4, ParentObjectHandle=2, PreviousSiblingObjectHandle=3, NextSiblingObjectHandle=5, ChildObjectHandle=NULL, and FileName="IMG_0002.JPG."

Subsequently, the object information of "IMG_0003.JPG" of Handle=5 is recorded in TreeDataTable as the image information including InitState being in the folder structuring state, Handle=5, ParentObjectHandle=2, PreviousSiblingObjectHandle=4, NextSiblingObjectHandle=NULL, ChildObjectHandle=NULL, and FileName="IMG_0003.JPG."

Next, the object information of the folder "101GANON" is recorded in the TreeDataTable as the Association information, and the object information of image objects "IMG_0005.JPG" and "IMG_0006.JPG" that exist in the lower rank is recorded in TreeDataTable as image information.

Finally, the object information of a folder "MISC" and the inside of the folder "MISC" is recorded in TreeDataTable similarly to the way by which the object information of the folder "DCIM" and the inside of the folder "DCIM" is recorded in TreeDataTable.

Then, at Step ST111, when it is judged that there are no unregistered objects in the recording medium 711, the CPU 703 ends the creation processing of TreeDataTable. Incidentally, although only the writing to the main fields used for the processing to be mentioned later has been described here, it is needless to say that the cup 703 performs the storage of respective suitable values to the other fields.

Thus, with regard to each object in the recording medium 711, Association information is registered (added) into TreeDataTable with regard to the folders and the directories, and image information is registered (added) into TreeDataTable with regard to image files. Moreover, at this time point, the field InitState of each piece of object information is in the folder structuring state.

Hereinafter, a concrete example relative to how to process a PTP command from the PC 701 and to respond the PTP command by using the table created in such a way is described. (The processing of obtaining the number of objects in a folder); the processing in case of receiving a PTP command GetNumObjects from the PC 701 to obtain the number of the objects contained in the folder specified by the command is described.

Figure 10:
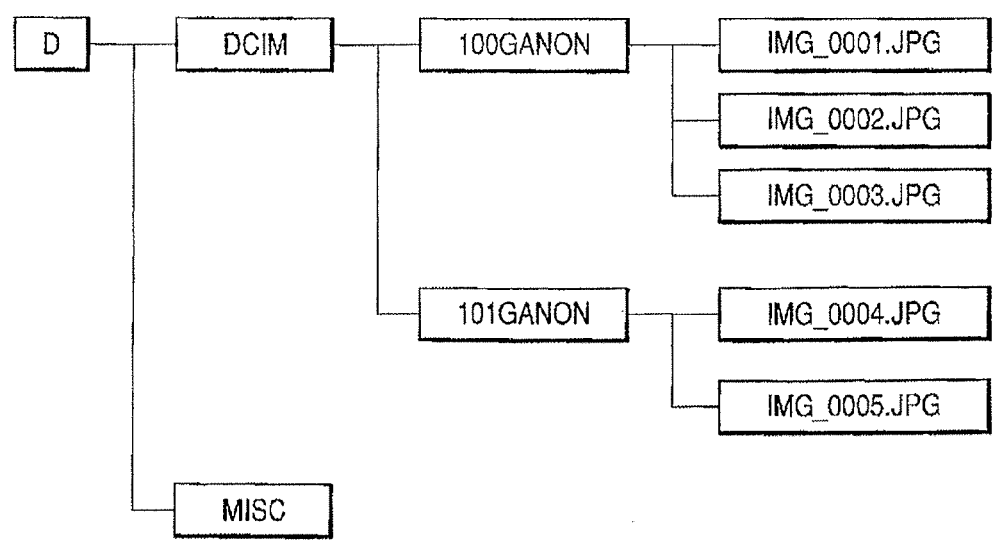
FIG. 10 is a diagram showing an example of the hierarchical structure of the objects in a recording medium installed in a digital camera.

Here, it is supposed that obtaining the number of objects in the folder "100GANON" is requested in the state of FIG. 10, i.e. in the state in which there are three objects, "IMG_0001.JPG", "IMG_0002.JPG", and "IMG_0003.JPG", in the folder "100GANON."

First, the CPU 703 takes out the object handle (information which specifies the folder "100GANON") contained in the PTP command, and retrieves from TreeDataTable the object information having a value equal to the value of the taken-out object information in the field Handle. When the object information is found, the CPU 703 obtains the number which the field ChildNum in the object information (because it is the object information of a folder here, the object information is the Association information) indicates, as the number of the objects in "100GANON", and the CPU 703 returns the obtained number to the PC 701.

Object Information Obtaining Processing

Next, the processing at the time of receiving the PTP command GetObjectInfo from the PC 701, and of obtaining the information relative to the object specified by the command is described.

Here, it is supposed that it is requested to obtain the object information of the image object "IMG_0001.JPG" in the folder "100GANON" of FIG. 10.

First, the CPU 703 takes out the object handle (information which specifies the image object "IMG_0001.JPG") contained in the PTP command, and retrieves from TreeDataTable the object information which has a value equal to the value of the taken-out object handle in the field Handle.

When the object information is found, the CPU 703 referrers to the field InitState in the object information (here, image information). Because information is stored in all the fields in the image information when InitState is in an object information-minute-recording state, the CPU 703 obtains the information of the present image object from the field necessary for the image information, and returns to the obtained information to the PC 701.

On the other hand, when the object information of "IMG_0001.JPG" has not been obtained once after TreeDataTable has been created, InitState is in the folder structuring state. In this case, the CPU 703 reads the file header of the image object from the storage medium 711 in the digital camera 700, and obtains the information of the image object.

After obtaining the information on the image object, the CPU 703 writes the information obtained from the header into the fields on and after the field Year of image information (writes a photographing date and time, the size of a thumbnail image, the horizontal size of an image, and the vertical size of the image into the fields Year, Month, Day, Hour, Min, Sec, ThumbSize, PixWidth, and PixHeight in the image information), and the CPU 703 changes InitState of the image information into the object information-minute-recording state.

Then, the CPU 703 returns the object information to the PC 701.

Object Data Obtaining Processing

Next, the processing at the time of receiving the PTP command GetObject from the PC 701 and of obtaining the object data specified by the command is described.

Here, it is supposed that it is requested to obtain the object data of the image object "IMG_0001.JPG" in the folder "100GANON" of FIG. 10.

First, the CPU 703 takes out the object handle (information for specifying the image object "IMG_0001.JPG") contained in the PTP command, and retrieves from TreeDataTable the object information having a value equal to the value of the taken-out object handle in the field Handle. When the object information is found, the CPU 703 refers to the field FileName in the retrieved object information (image information). The CPU 703 refers to the field ParentObjectHandle, and obtains an object handle "2" of the parent object (folder "100GANON") of "IMG_0001.JPG". The CPU 703 retrieves the object information having the object handle in field Handle from TreeDataTable. When the object information is found, the CPU 703 refers to the field FileName of the object information (object information of the folder "100GANON").

The CPU 703 refers to the field ParantObjectHandle, and obtains an object handle "1" of the parent object (folder "DCIM") of "100GANON". The CPU 703 retrieves the object information which has the object handle in the field Handle from TreeDataTable. When the object information is found, the CPU 703 refers to the field FileName of the object information (the object information of the folder "DCIM").

The CPU 703 refers to the field ParentObjectHandle, and obtains an object handle "0" of the parent object (volume "D"). The CPU 703 retrieves the object information which has the object handle in the field Handle from TreeDataTable.

When the object information is found, the CPU 703 refers to the field FileName of the object information (the object information of the volume "D"). Because the volume "D" is the highest rank, the CPU 703 does not perform the retrieval of the higher rank beyond the rank.

By arranging the Filenames which have been referred to by the above steps in order, the full path "D:¥DCIM¥100GANON¥IMG_0001.JPG" of "IMG_0001.JPG" can be obtained. The CPU 703 accesses "IMG_0001.JPG" recorded in the storage medium 711 in the digital camera 700 by the full path, and transfers the image data "IMG_0001.JPG" to the PC 701.

Thus, by using TreeDataTable of the present embodiment, object information can be immediately referred to from the object handle specified in the PTP command. Moreover, because the information enabling the specification of at least a parent object is included in the object information, the full path of an object can be obtained by subsequently obtaining the file names in order to the top rank.

In the case of the recording medium 711 which has the folder structure of FIG. 10, it is possible to obtain the full paths of any image objects by referring to TreeDataTable four times independently of the number of the image objects.

On the other hand, by the method described with the prior art, because it is necessary to retrieve an object handle sequentially from the beginning of a table, the number of times of reference to the table increases as the number of objects increases, and the obtainment of a full path takes time.

Deletion Processing of Object

Next, the processing at the time of receiving a PTP command DeleteObject from the PC 701, and of deleting the object specified by the command is described. Here, it is supposed that the deletion of the image object "IMG_0001.JPG" in the folder "100GANON" of FIG. 10 is required.

First, the CPU 703 takes out the object handle (information for specifying the image object "IMG_0001.JPG") contained in the PTP command, and retrieves from TreeDataTable the object information having a value equal to the value of the object handle in the field Handle.

When the object information is found, the CPU 703 rewrites the value of the field UsedFlag in the object information (image information) to FALSE (invalid), and deletes the image object "IMG_0001.JPG" from the storage medium 711 in the digital camera 700. Then, the CPU 703 performs the change processing of the related fields in the other objects. In concrete terms, with regard to the object information of the parent object of the deleted object, the CPU 703 decreases the field ChildNum by one. Moreover, if the deleted object is the child object at the top, the CPU 703 rewrites ChildObjectHandle to the handle stored in NextSiblingObjectHandle of the deleted object.

Moreover, the CPU 703 changes PreviousObjectHandle of the object specified by NextSiblingObjectHandle of the deleted object into NULL. Moreover, because the condition that the handle of the next child object–the handle of a child object=1 is not held in the case where the deleted object is one other than the child object of the top or the end, the CPU 703 updates ChildState indicating the consecutive numbers of the object handle to FALSE.

However, in the case where ChildState is FALSe and the number of the child objects becomes one by performing the deletion of an object, the CPU 703 updates ChildState to TRUE.

Moreover, in the case where the deleted object is a parent object, the CPU 703 sets UsedFlag of the object information of all the objects of the child object and the following objects to FALSE.

Registration Processing of Object Information from PC

Next, the processing of receiving a PTP command SendObjectInfo from the PC 701 and of registering object information into TreeDataTable is described.

Hereupon, a case where the object information of the image object which does not exist in the recording medium 711 of the camera 700 is transmitted to the camera 700 from the PC 701, and where the transmitted object information is registered as the object information of an object "IMG_0006.JPG" in the folder "100GANON" in the recording medium 711 is supposed.

Moreover, it is supposed that object information can be still registered (not recorded to the last index) in TreeDataTable hereupon.

Figure 11:
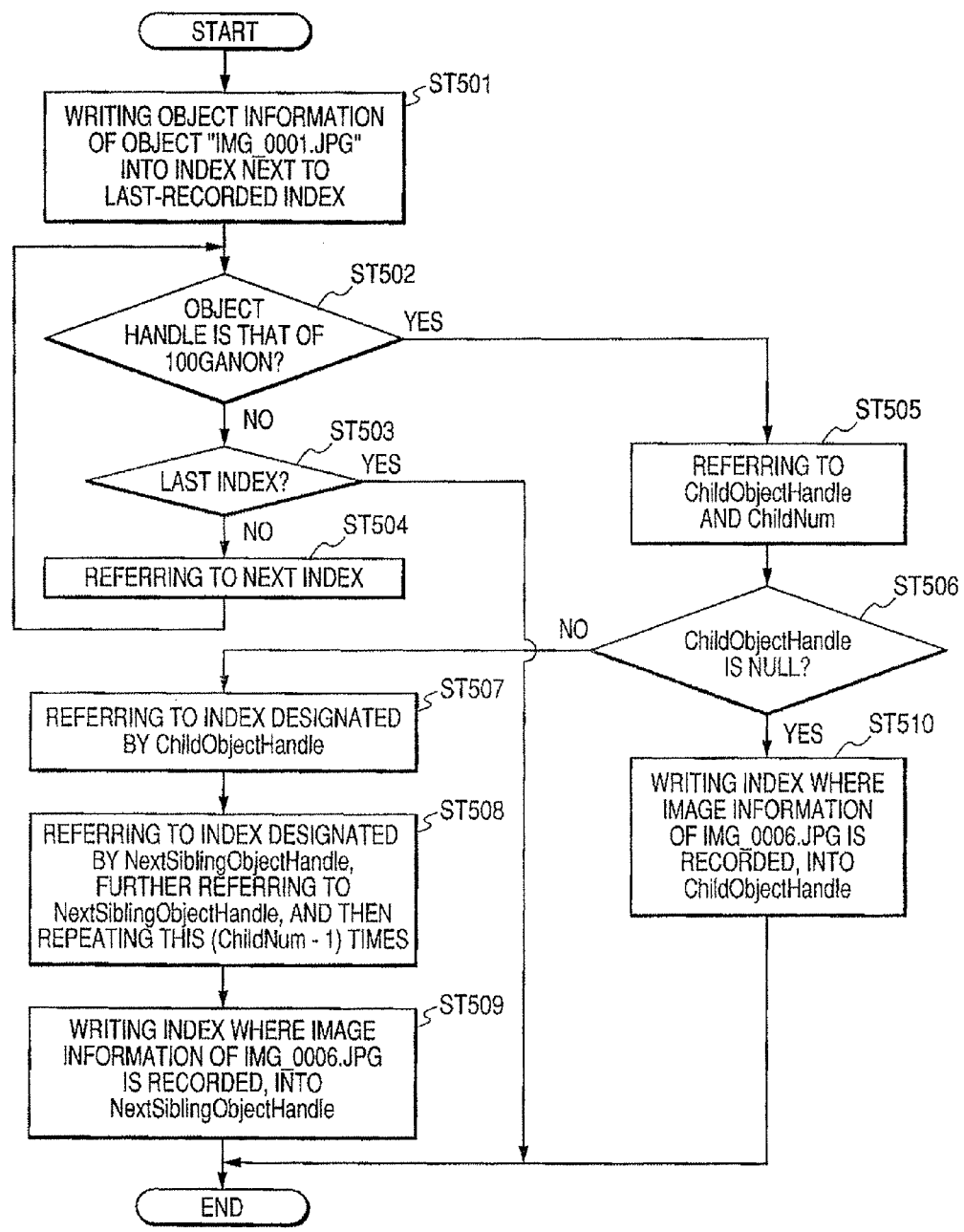
FIG. 11 is a flowchart illustrating the processing at the time of executing a SendObjectInfo command using TreeDataTable in the second embodiment.

The registration processing to TreeDataTable at the time of receiving the PTP command SendObjectInfo is described with reference to the flowchart shown in FIG. 11 hereinafter.

In TreeDataTable, the CPU 703 writes the image information of the image object "IMG_0006.JPG" in the next index to the last index in which object information is recorded (Step ST501). Referring to a field Handle, the CPU 703 judges whether the object handle is that of the object "100GANON" or not (Step ST502). When the object handle is judged not to be the object handle of the object "100GANON" at Step ST502, the CPU 703 judges whether the index of the referred object information is the last index of TreeDataTable or not at Step ST503. When the index is judged not to be the last index at Step ST503, the CPU 703 refers to the next index (object information) at Step ST504. Next, the processing of the CPU 703 returns to Step ST502. When the index is judged to be the last index at Step ST503, the CPU 703 ends the processing.

When the object handle is judged to be the handle of the object "100GANON" at Step ST502, namely when the object information of "100GANON" is found in TreeDataTable, the CPU 703 refers to the field ChildObjectHandle and the field ChildNum of the Association information where the Handle is contained at Step ST505. Moreover, the CPU 703 increases the value of ChildNum by one.

The CPU 703 judges whether the field ChildObjectHandle is NULL or not at Step ST506. When the filed ChildObjectHandle is judged to be not NULL at Step ST506, namely, when another image file already exists in the folder "100GANON", the CPU 703 refers to the object information of the index designated by the field ChildObjectHandle, at Step ST507.

Referring to the field NextSiblingObjectHandle of the image information of a reference destination, the CPU 703 refers to the object information of the index designated by the field NextSiblingObjectHandle. The CPU 703 repeats the processing by "value recorded in the field ChildNum—1" times (Step ST508). Herewith, the CPU 703 reaches the last object information corresponding to the image files (under the folder "100GANON" by one rank) included in the folder "100GANON."

At Step ST509, the CPU 703 writes the index (the value of Handle) in which the image information of "IMG_0006.JPG" is recorded at Step ST501, in the field NextSiblingObjectHandle of the object information. Herewith, "IMG_0006.JPG" has been registered into TreeDataTable as one existing under the folder "100GANON" by one rank.

On the other hand, when the field ChildObjectHandle of the object "100GANON" is judged to be NULL (namely, when no image files exist in the folder "100GANON" yet) at Step ST506, the CPU 703 writes the index in which the image information of "IMG_0006.JPG", into the field ChildObjectHandle at Step ST510. Incidentally, the judgment at Step ST507 may be the judgment of investigating whether the field ChildNum is zero or not.

Object Size and Offset Obtaining Processing

Next, the processing at the time of receiving an expanded PTP command GetPartialObjectInfo from the PC 701 and of obtaining the object size and the offset from which object data begins relative to the object specified by the command is described. Here, GetPartialObjectInfo is a command which specifies the kind of a component in an object and obtains the size of the component and the offset of the component from the top of the object.

Here, it is supposed that it is requested to obtain the information of the size of the whole JPEG image data (not the data of a thumbnail image, but the actual image data) of the image object "IMG_0001.JPG" existing in the folder "100GANON" of FIG. 10 and the offset from the top of the object "IMG_0001.JPG" (namely, the values of the field Offset and Size).

First, the CPU 703 takes out the object handle (information which specifies the image object "IMG_0001.JPG") contained in the PTP command, and retrieves from TreeDataTable the object information which has a value equal to the value of the taken-out object handle in the field Handle.

When the object information is found, the CPU 703 refers to the field InitState in the object information.

When InitState is in the object information-minute-recording state as a result of the reference, because the values are already read into the fields Offset and Size as described above, the CPU 703 obtains the size of the whole JPEG image being the component of the object "IMG_0001.JPG" and the offset from the top of the object "IMG_001.JPG" for the whole JPEG image on the basis of the field Size and Offset in the image information.

On the other hand, when InitState is in a file structuring state, because no values are read into the fields Offset and Size, in the way as described relative to the object data obtaining processing described above, the CPU 703 obtains the full path of the object "IMG_0001.JPG". Then, the CPU 703 refers to the header file of the object "IMG_0001.JPG"

recorded in the storage medium 711, and obtains a byte count of the whole JPEG image that is the component of the object "IMG_0001.JPG" and the offset from the top of the object "IMG_0001.JPG" relative to the whole JPEG image. Then, the CPU 703 returns the information to the PC 701.

Object Handle Obtainment Processing from Full Path

Next, the processing at the time of receiving an expanded PTP command GetObjectHandleByName from the PC 701 and of obtaining an object handle from the path name specified by the command is described.

Hereupon, GetObjectHandleByName is a PTP expansion command instructing the obtainment of the handle of an object indicated by the path name. By the extended command, an object is specified not by the object handle but by the full path. Hereupon, it is supposed that the handle obtainment of the object specified by a full path "D:¥DCIM¥100GANON¥IMG_0001.JPG" in a command is required.

Figure 12:
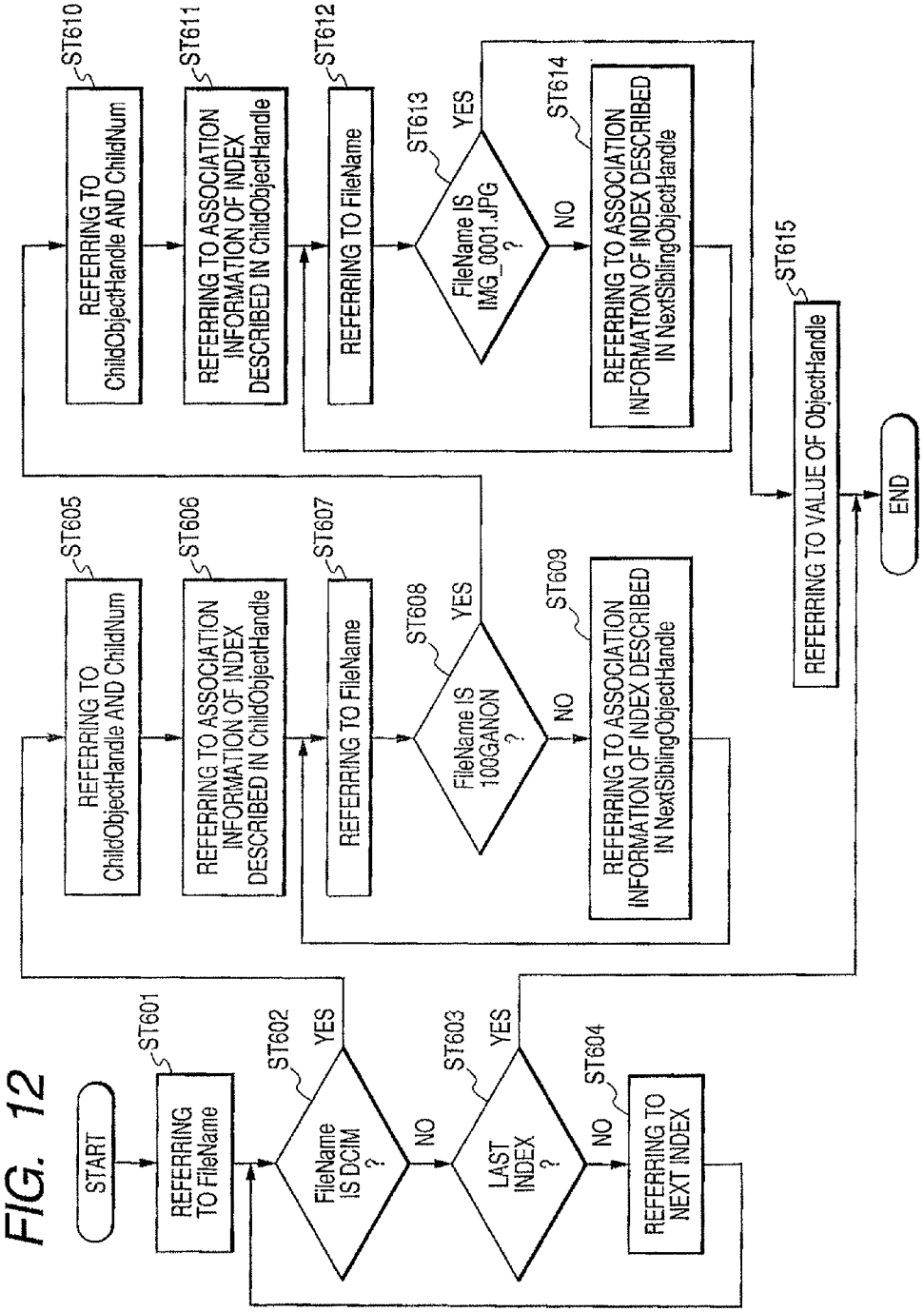
FIG. 12 is a flowchart illustrating the processing at the time of executing a GetObjectHandleByName command using TreeDataTable in the second embodiment.

In the following, referring to the flowchart shown in FIG. 12, the processing is described.

First, the CPU 703 retrieves the object information corresponding to "DCIM" from TreeDataTable in Steps ST601-ST604. That is, the CPU 703 refers to the field FileName of each piece of object information in TreeDataTable at Step ST601. Incidentally, because it is clear that "DCIM" is not an image object, the CPU 703 may refer to the field FileName only for the object data in which the field FormatCode of object information is Association information.

Next, the CPU 703 judges whether the field FileName is "DCIM" or not at Step ST602. When it is judged that the field FileName is not a "DCIM" folder at Step ST602, the CPU 703 judges whether the field FileName is the last index (the last object data) or not at Step ST603.

When it is judged that the field FileName is not the last index at Step ST603, the CPU 703 refers to the field FileName of the next object data at Step ST604, and the processing of the CPU 703 returns to Step ST602. When it is judged that the field FileName is the last index at Step ST603, the CPU 703 ends the processing.

When an object data having FileName of "DCIM" is found at Step ST602, the CPU 703 refers to the fields ChildObjectHandle and ChildNum of the object information at Step ST605.

Next, the CPU 703 refers to the object information indicated by a handle (index number) described in the field ChildObjectHandle at Step ST606. Next, the CPU 703 refers to the field FileName at Step ST607.

Next, the CPU 703 judges whether FileName is "100GANON" or not at Step ST608. When it is judged that the FileName is not "100GANON" at Step ST608, the CPU 703 refers to object information (namely, the object information in another folder at the same rank) indicated by the index number described in NextSiblingObjectHandle, at Step ST609.

Next, the processing of the CPU 703 returns to Step ST607, and the CPU 703 performs searches of TreeDataTable maximum ChildNum times (two times in the example of FIG. 10) until the CPU 703 refers to the object information of "100GANON." On the other hand, when it is judged that FileName is "100GANON" at Step ST608, the CPU 703 refers to the fields ChildObjectHandle and ChildNum at Step ST610.

Next, the CPU 703 refers to the object information indicated by an index number described in ChildObjectHandle at Step ST611. Next, the CPU 703 refers to the field FileName at Step ST612. Next, the CPU 703 judges whether FileName is the "IMG_0001.JPG" folder or not at Step ST613.

When it is judged that FileName is not "IMG_0001.JPG" at Step ST613, the CPU 703 refers to the object information indicated by an index number described in NextSiblingObjectHandle, at Step ST614.

Next, the processing of the CPU 703 returns to Step ST612, and the CPU 703 searches TreeDataTable only ChildNum times of "100 maximum GANON" object information at the maximum until the CPU 703 refers to the image information of "IMG_0001.JPG."

When it is judged that FileName is "IMG_0001.JPG" at Step ST613, the CPU 703 refers to the field Handle of the object information at Step ST615, and transfers the object handle corresponding to the path name "D:¥DCIM¥100GANON¥IMG_0001.JPG" to the PC 701 at Step ST615.

Obtainment of All Object Handles in Storage

Next, the processing at the time of receiving the PTP command GetObjectHandles from the PC 701 and of obtaining all the object handles of a specified object format in storage is described.

Hereupon, GetObjectHandles is a PTP command instructing the obtainment of the handles of all the objects in storage. Here, it is supposed that the formats of the object to be obtained are all objects.

In the following, referring to the flowchart shown in FIG. 15, the processing is described.

The CPU 703 refers to the field FileName of TreeDataTable at Step ST901. At Step ST902, the CPU 703 judges whether the field FileName is "DCIM" or not. When it is judged that the field FileName is not "DCIM" at Step ST902, the CPU 703 judges whether the field FileName is the last index or not (Step ST903).

When it is not judged that the field FileName is the last entry at Step ST903, the CPU 703 refers to the next index of TreeDataTable (Step ST904), and the processing of the CPU 703 returns to Step ST901. When it is judged that the field FileName is the last entry at Step ST903, the CPU 703 ends the processing. When it is judged that the filed FileName is "DCIM" at Step ST901, the CPU 703 refers to the filed Handle to obtain the value of "DCIM" (Step ST905).

Next, at Step ST906, the CPU 703 refers to the field ChildHandle, and refers to the index of "100GANON" of TreeDataTable. Next, at Step ST907, the CPU 703 refers to the field Handle to obtain the object handle of the folder "100GANON". It is supposed that the value of the obtained object handle is h. Next, at Step ST908, the CPU 703 refers to the field ChildNum. It is supposed that the value of the field ChilNum is N (the value N is 3 in FIG. 10).

Next, the CPU 703 refers to the field ChildState at Step ST909. Next, at Step ST910, the CPU 703 judges whether ChildState is "TRUE" or not. When it is judged that the ChildSate is "TRUE" at Step ST910, the CPU 703 can obtain N values h+1, h+2, . . . , h+N as the values of the object handles in the folder "100GANON" on the basis of the value h of the object handle of the folder "100GANON" obtained at Step ST907 and the number N of the child objects obtained at Step ST908 (Step ST911).

Next, the processing of the CPU 703 progresses to Step ST918. When it is judged that ChildState is "FALSE" at Step ST910, the CPU 703 refers to the field ChildHandle, and refers to the entry of the image object "IMG_0001.JPG" of TreeDataTable at Step ST912. At Step ST913, the CPU 703 refers to the field Handle to obtain the object handle of the image object "IMG_0001.JPG."

At Step ST914, the CPU 703 judges whether N is 1 or not. When it is judged that the N is 1 at Step ST914, the CPU 703 ends the processing. When it is judged that the N is not 1 at Step ST914, the CPU 703 refers to the index of the image object described in the field NextSiblingObjectHandle (Step ST915).

Next, the CPU 703 refers to the field Handle at Step ST916, and obtains the value of the filed Handle. At Step ST917, the CPU 703 judges whether Step ST915 and Step ST916 are performed (N−1) times or not. When it is not judged that Step ST915 and Step ST916 have been performed (N−1) times at Step ST917, the processing of the CPU 703 returns to Step ST915.

When it is judged at Step ST917 that Step ST915 and Step ST916 have been performed (N−1) times, the processing of the CPU 703 progresses to Step ST918. At Step ST918, the CPU 703 refers to NextSiblingObjectHandle (the folde "101GANON" in the example of FIG. 10) of the folder having an image object in the child objects (the folder "100GANON" in the example of FIG. 10), and refers to the index of NextSiblingObjectHandle. At Step ST919, the CPU 703 judges whether NextSiblingObjectHandle is NULL or not.

When it is judged at Step ST919 that NextSiblingObjectHandle is NULL, because the CPU 703 has obtained all the object handles, the CPU 703 ends the processing. When it is judged at Step ST919 that NextSiblingObjectHandle is not NULL, the CPU 703 executes the processing of from Step ST907 to Step ST917 (Step ST920). That is, the CPU 703 can obtain all the object handles in the folder "101GANON" of FIG. 10 at Step ST920. Next, the processing of the CPU 703 returns to Step ST108.

The CPU 703 can obtain the handles of all the objects that exist in the storage by the above processing.

At that time, in the case where the field ChildState of TreeDataTable of the folder having an image object at a rank below by one rank is "TRUE", it is not necessary to follow the handles of child objects and to follow the handles of N of the image objects at the same rank. Consequently, the speed of the processing can be heightened.

Invalid Area Reuse Processing of TreeDataTable

As mentioned above, in the present embodiment, the size of TreeDataTable is fixed, and the number of the objects which can record object information in one TreeDataTable is also fixed. Therefore, when object information is recorded relative to the maximum number of objects (when the indices are used to the last index), it is impossible to record the object information relative to a new object.

However, like the object information relative to the deleted object, if there is invalid object information (the information having the field UsedFlag being FALSE), it is possible to reuse the area.

Figure 13:
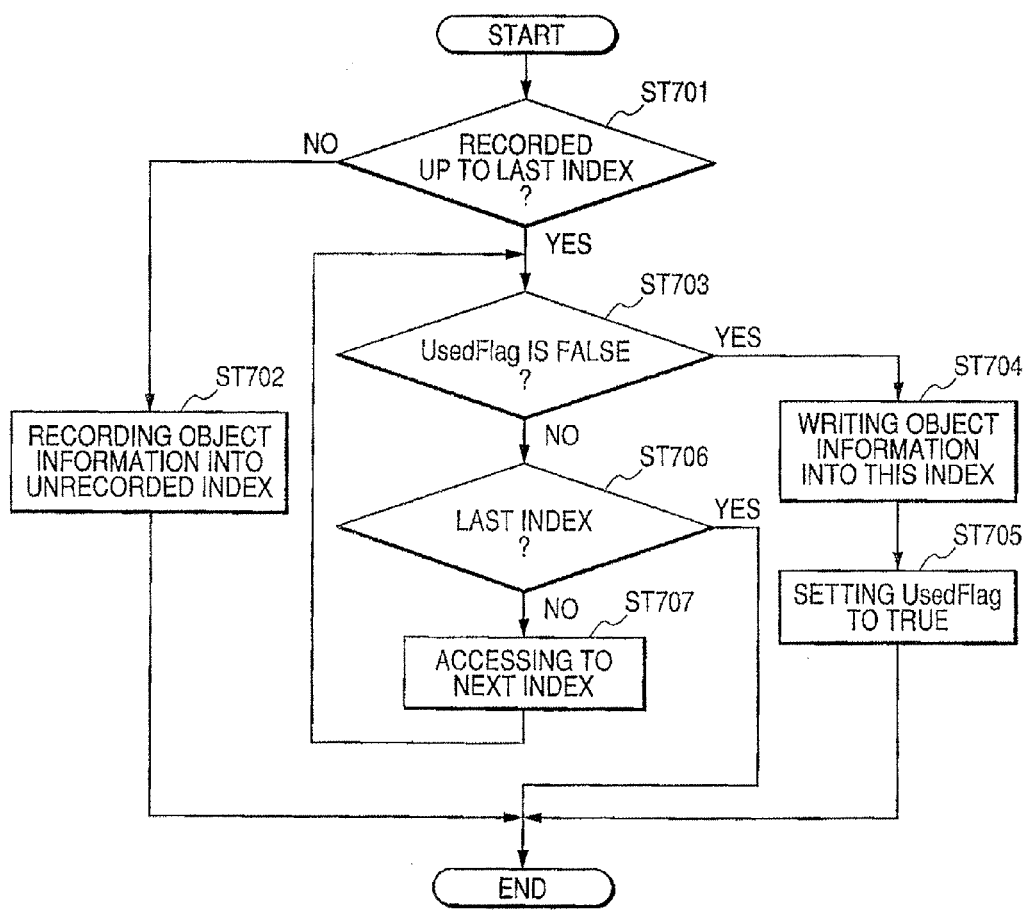
FIG. 13 is a flowchart illustrating the processing at the time of adding object information to TreeDataTable in the second embodiment.

Hereinafter, the reuse processing is described with reference to the flowchart of FIG. 13.

Here, it is supposed that TreeDataTable is in the state in which object information is recorded to the last index, and that the recording of the information of a new image object "IMG_0010.JPG" into TreeDataTable in that state is tried.

At Step ST701, the CPU 703 retrieves the object information index which is not recorded upto the terminus of TreeDataTable. Next, when there is an object information area which is not recorded, the CPU 703 writes the object information of a new object in the area (Step ST702). Thus, the processing of step ST701-ST702 is equivalent to the additional processing of the new object information in the state where there is still an empty area.

Hereupon, because there is already no empty area, the processing of the CPU 703 progresses to Step ST703, and the CPU 703 retrieves the object information having a field UsedFlag being FALSE from the top of TreeDataTable. That is, when UsedFlag is TRUE, the CPU 703 judges whether the object information is the last index or not at Step ST706. When the object information is judged not to be the last index, the CPU 703 accesses the next index at Step ST707, and the processing of the CPU 703 returns to Step ST703.

When the object information is judged to be the last index at Step ST706, the fields Used of all the indices of TreeDataTable are TRUE, and it is impossible to add new object information. Consequently, the CPU 703 ends the processing as unprocessed. On the other hand, at Step ST703, when UsedFlag is FALSE, the CPU 703 overwrites the object information of the image object "IMG_0010.JPG" on the object information (Step ST704).

Then, at Step ST705, the CPU 703 changes the field UsedFlag of the object information into TRUE. Thus, the limited area can be reused without futility by using UsedFlag.

As described above, according to the present embodiment, by creating a table storing the information indicating a relative positional relationship of each object included in a recording medium with at least another object, in concrete terms, by creating a table storing the information of an object including the information capable of specifying at least a parent object in a logical rank folder structure, retrieval at a high speed can be performed even if the number of the objects contained in the recording medium, in concrete terms, the number of image files, becomes larger.

Furthermore, by including the information capable of specifying a top child object as object information, and by recording the information specifying another child object relative to a plurality of child objects which have the common parent object and belong to the same rank in a logical hierarchical structure, it is easily performed to search a specific child object among a plurality of child objects of a certain parent object.

Furthermore, by making the information relative to the number of the child objects be included in the object information with regard to a parent object, it is possible to grasp the number of the child objects at a higher speed than that of the conventional method of counting the child objects.

Moreover, because object handles and the indices of a table correspond to each other in a one-to-one relation (they are associated with each other in the way of having the same values or being in a predetermined relationship), the present embodiment has an advantage that the retrieval time becomes shorter in case of performing the retrieval of an object by specifying an object handle with a PTP command. In particular, in the case where each piece of object information in a table is recorded in an area having a fixed size, the starting position of the object information can be immediately obtained from an object handle. Consequently, the speed of retrieval is accelerated.

Moreover, relative to the object information included in the file header of an image object, by obtaining it at the time of a first request to register the obtained object information into a table, the time necessary for the creation of the table is shortened, and the object information can be obtained without accessing the file again when the same information is requested after that.

Moreover, in the case where the handles of all the child objects of an object are obtained, when the values of the handles of all the child objects are shown to be consecutive numbers, the values can be obtained by calculations from the handles of the object.

Therefore, it becomes possible to obtain the values of the handles of all the child objects at a higher speed than that of the conventional method of accessing each child object to obtain every one handle of the child object.

Third Embodiment
Use of StrageInfoTable

In the imaging apparatus of the embodiments mentioned above, it is also possible to further create a table StrageInfoTable for recording storage information further. FIG. 9 is a view showing an example of StorageInfoTable which the digital camera 700 of the present embodiment can create into the temporary storage apparatus 706 in the camera after the creation of TreeDataTable.

StorageInfoTable is a table for recording the storage information of the recording medium 711 inserted in the digital camera and a logical recording medium created in the temporary storage apparatus 706 defined by PTP.

StorageInfoTable is a table different from TreeDataTable of FIG. 8. StorageInfoTable has two kinds of information such as the information ST for every storage ID and the information MT relative to the whole.

Because it is necessary to generate logical storage information according with respect to the standard of PTP, two kinds of information ST are created to one recording medium. Here, because the size per information ST1 entry for every storage ID is a fixed size, it is possible to specify which storage ID information on a StorageInfo table an entry is, by specifying the field DriveNo of TreeDataTable of FIG. 8.

Field ValidFlag is a flag which indicates whether the information is effective or not. A field Num is the number of pieces of the information ST recorded on StorageInfoTable. A field TotalObjectNum is the number of objects (a summation of ObjectNum of each information ST) which exist in the storage corresponding to all pieces of the information ST recorded on StorageInfoTable. RollState shows the state in which TreeDataTable of FIG. 8 is written in to the last index and the field UsedFlag which has become invalid in FIG. 8 may be reused.

AccessCapability indicates whether reading and writing can be performed to the storage (a recording medium or its logical storage information) corresponding to the information ST or not. DriveName is a volume name, and is one character. DriveName becomes the same one as the field FileName of TreeDataTable of FIG. 8. StorageID is a storage ID. RootHandle is a handle (an object handle corresponding to a directory D at the example of FIG. 10) to a root directory. ObjectNum is the number of the objects contained in the storage corresponding to the information-ST. Reserve is a reserved area.

StrageInfo Table Creation Processing

As mentioned above, the digital camera 700 of the present embodiment can create StorageInfoTable to the temporary storage apparatus 706 after creating TreeDataTable. In this case, the CPU 703 refers to the memory card 711 installed in the camera 700, and creates the storage information ST1 of the memory card 711 and logical storage information ST2. Furthermore, the CPU 703 generates MT1 as the whole storage information, and stores a suitable value for each field.

Incidentally, relative to volume information, the field DriveName of StorageInfoTable and the field FileName of TreeDataTable become the same character, and the field RootHandle of StorageInfoTable and the field Handle of TreeDataTable become the same value.

In the example of FIG. 10, the information relative to volume "D" is created in this way. Relation of StorageInfoTable and TreeDataTable Below, an example of using two tables, StorageInfoTable and TreeDataTable, is described.

1. Obtainment of File Size

An example which is going to access a storage medium and is going to obtain the file size of an image object is described.

Here, it is supposed that the file size of the image object "IMG_0001.JPG" which exists in the folder "100GANON" in the volume "D2 of FIG. 10 is obtained.

The CPU 703 accesses an image object "IMG_0001.JPG" entry from TreeDataTable. Next, the CPU 703 refers to the field DriveNo.

Next, the CPU 703 accesses the entry of the volume "D" of StorageInfoTable from DriveNo of the image object "IMG_0001.JPG" obtained from TreeDataTable.

Next, the CPU 703 refers to the field StorageID on StorageInfoTable of the volume "D".

The CPU 703 refers to upper two bytes of obtained StorageID. If the upper two bytes of StorageID is 0x0001, because data exists on real storage, a file size is obtained from the header of the image object "IMG_0001.JPG" which exists on real storage.

If the upper two bytes of StorageID is 0x8000, because data exists on virtual storage, a file size is obtained from the header of the image object "IMG_0001.JPG" which exists in a memory different from the real storage.

2. Prohibition on Deletion of Object by Access Attribute

An example of trying to delete an object when the access attribute of storage is write-inhibited is described.

Here, it is supposed that the volume "D" of FIG. 10 is a write-inhibited attribute and the image object "IMG_0001.JPG" which exists in the folder "100GANON" is deleted.

The CPU 703 accesses the image object "IMG_0001.JPG" entry from TreeDataTable.

Next, the CPU 703 refers to the field DriveNo.

Next, the CPU 703 accesses the entry of the volume "D" of StorageInfoTable from DriveNo of the image object "IMG_0001.JPG" obtained from TreeDataTable.

Next, the CPU 703 refers to the field "AccessCapacity" on StorageInfoTable of the volume "D".

The processing of deleting the image object "IMG_0001.JPG" is stopped because the attribute of the field "AccessCapacity" is a write-inhibited attribute.

Although the present embodiment has been described with regard to the deletion of the image object in a volume, the deletion of a folder in a volume is also the same. Moreover, the addition of an object is the same.

According to the present invention, by the above configuration, the time necessary for the operations (such as reading, deletion and informational obtainment) of an object recorded on the recording media in the imaging apparatus (a built-in memory, a detachable memory card and the like) can be shortened.

Other Embodiments

In the above-mentioned embodiments, timing at which the object information of an image object (image information) shifts from the folder structuring state to the object information-minute-recording state has been set as a time point when the object information is actually requested.

By setting in this way, only when required, the file of an image object is accessed, and the reduction of the processing load of the camera and the shortening of a time necessary for the creation of TreeDataTable can be realized.

However, when a camera is in a state in which the load thereof is small such as an idol state, image object files may be sequentially accessed to obtain information from the file headers, and the obtained information may be written in the table.

Incidentally, the present invention also includes a case where a program of the software realizing the functions of the embodiments mentioned above is supplied from a recording medium directly, or through wired/wireless communication, to an imaging apparatus or an information processing apparatus (called as a computer in a lump) which is equipped with a CPU and other structures capable of the execution of the program, and equivalent functions are attained by the execution of the supplied program by the apparatus.

Therefore, the program codes themselves which are supplied to the computer to be installed therein in order to realize the functional processing of the present invention by the computer also realize the present invention. That is, the computer program for realizing the functional processing of the present invention itself is included in the present invention.

In that case, as long as the software has the function of the program, the form of the program such as object codes, the program executed by an interpreter, and the script data supplied to an OS is not matter.

As a recording medium for supplying a program, for example, there are magnetic recording media such as a flexible disk, hard disk and a magnetic tape, optical/magneto-optical storage medium such as an MO, a CD-ROM, a CD-R, a CD-RW, a DVD-ROM, a DVD-R and a DVD-RW, a non-volatile semiconductor memory and the like.

As the supply method of a program using a wired/wireless communication, there can be cited a method of storing data files (program data files) which can serve as a computer program which forms the present invention on a client computer, such as the computer program itself which forms the present invention, or a file which is compressed and includes an automatic installation function, in the server on a computer network, and of downloading a program data file to the client computer which has been connected.

In this case, it is also possible to divide a program data file into a plurality of segment files, and to arrange the segment files to different servers.

That is, a server apparatus which let a plurality of users download a program data file for realizing the functional processing of the present invention with a computer is also included in the present invention.

Moreover, it is also possible to encipher the program of the present invention, to store the enciphered program in a storage media, such as a CD-ROM, to distribute the storage media to users, to supply the key information which solves the encryption to the user who fulfills predetermined conditions by making the user download the key information from a homepage, for example, through the Internet, and to realize the functional processing of the present invention by executing the enciphered program by using the key information and by letting the user install the program in a computer.

Moreover, in addition to the realization of the functions of the embodiments mentioned above by executing the program which the computer has read, the functions of the embodiments mentioned above can be realized by the actual processing partially or wholly executed by an OS or the like working on the computer based on the instructions of the program.

Furthermore, after a program read from a recording medium has been written in a memory provided in a function enhancement board inserted into a computer or a function enhancement unit connected to the computer, the CPU or the like provided in the function enhancement board or the function enhancement unit executes a part or the whole of the actual processing based on the instructions of the program, and the functions of the embodiments mentioned above can be realized also by the processing.

The present invention is not limited to the above embodiments and various changes and modifications can be made within the spirit and scope of the present invention. Therefore to apprise the public of the scope of the present invention, the following claims are made.

This application claims priority from Japanese Patent Applications Nos. 2004-270084 filed Sep. 16, 2004 and 2004-272525 filed Sep. 17, 2004, which are hereby incorporated by reference herein.

The invention claimed is:

1. A communication apparatus that communicates with an information processing apparatus, to transmit file information stored in a storage medium connected to the communication apparatus, to the information processing apparatus, the communication apparatus comprising:
a display unit;
an activation unit configured to activate the communication apparatus in a reproduction mode for reproducing a file stored in the storage medium on the display unit;
a connection unit configured to connect to the information processing apparatus;
a cache memory configured to cache entry information of the file stored in the storage medium, before the communication apparatus connects to the information processing apparatus through a physical layer by the connection unit;
a generation unit configured to generate, based on the entry information cached in the cache memory, information necessary for transmitting the file information in accordance with a predetermined communication protocol, after the communication apparatus connects to the information apparatus through the physical layer by the connection unit; and
a transmission control unit configured to control transmission of the information generated by the generation unit to the information processing apparatus via the connection unit, in response to a request from the information processing apparatus,
wherein, in the reproduction mode, the file stored in the storage medium is reproduced using at least a portion of the entry information of the file stored in the storage medium, and
wherein the cache memory caches the entry information in accordance with the communication apparatus being activated in the reproduction mode.

2. The communication apparatus according to claim 1, wherein the information generated by the generation unit includes information relating to a plurality of files, and wherein the transmission control unit controls transmission of the information generated by the generation unit to the information processing apparatus in a batch.

3. The communication apparatus according to claim 1, wherein in a case where the generation unit has not yet completed generation of the information, the transmission control unit causes the transmission of the information to stand by until the generation unit completes the generation of the information.

4. The communication apparatus according to claim 1, wherein the cache memory caches the entry information of each of a plurality of files stored in the storage medium.

5. The communication apparatus according to claim 1, further comprising an image pickup unit configured to pick up an object image to obtain an image file,
wherein the communication apparatus is configured to transmit the image file obtained by the image pickup unit.

6. A communication system in which a communication apparatus communicates with an information processing apparatus, to transmit file information stored in a storage medium connected to the communication apparatus, to the information processing apparatus, the communication apparatus comprising:
- a display unit;
- an activation unit configured to activate the communication apparatus in a reproduction mode for reproducing a file stored in the storage medium on the display unit;
- a connection unit configured to connect to the information processing apparatus;
- a cache memory configured to cache entry information of the file stored in the storage medium, before the communication apparatus connects to the information processing apparatus through a physical layer by the connection unit;
- a generation unit configured to generate, based on the entry information cached in the cache memory, information necessary for transmitting the file information in accordance with a predetermined communication protocol, after the communication apparatus connects to the information apparatus through the physical layer by the connection unit;
- a transmission control unit configured to control transmission of the information generated by the generation unit to the information processing apparatus by the connection unit, in response to a request from the information processing apparatus,
- wherein, in the reproduction mode, the file stored in the storage medium is reproduced using at least a portion of the entry information of the file stored in the storage medium, and
- wherein the cache memory caches the entry information in accordance with the communication apparatus being activated in the reproduction mode; the information processing apparatus comprising:
  - a requesting unit configured to request, from the communication apparatus, the entry information of the file stored in the storage medium, in accordance with the information processing apparatus being connected to the communication apparatus by the connection unit; and
  - a receiving unit configured to receive the information generated by the generating unit, in response to a request by the requesting unit.

7. A control method of a communication apparatus that includes a display unit and communicates with an information processing apparatus, to transmit file information stored in a storage medium connected to the communication apparatus, to the information processing, the method comprising steps of:
- activating the communication apparatus in a reproduction mode for reproducing a file stored in the storage medium on the display unit;
- connecting to the information processing apparatus by a connection unit;
- caching entry information of the file stored in the storage medium in a cache memory, before the communication apparatus connects to the information processing apparatus through a physical layer in the connecting step;
- generating, based on the entry information cached in the caching step, information necessary for transmitting the file information in accordance with a predetermined communication protocol, after the communication apparatus connects to the information apparatus through the physical layer in the connecting step; and
- controlling transmission of the information generated in the generating step to the information processing apparatus connected to in the connecting step, in response to a request from the information processing apparatus,
- wherein, in the reproduction mode, the file stored in the storage medium is reproduced using at least a portion of the entry information of the file stored in the storage medium, and
- wherein the cache memory caches the entry information in accordance with the communication apparatus being activated in the reproduction mode.

8. A non-transitory computer-readable storage medium storing a program for causing a computer to function, in a control method of a communication apparatus that includes a display unit and communicates with an information processing apparatus, to transmit file information stored in a storage medium connected to the communication apparatus, to the information processing, as:
- an activation unit configured to activate the communication apparatus in a reproduction mode for reproducing a file stored in the storage medium on the display unit;
- a connection unit configured to connect to the information processing apparatus;
- a cache memory configured to cache entry information of the file stored in the storage medium, before the communication apparatus connects to the information processing apparatus through a physical layer by the connection unit;
- a generation unit configured to generate, based on the entry information cached in the cache memory, information necessary for transmitting the file information in accordance with a predetermined communication protocol, after the communication apparatus connects to the information apparatus through the physical layer by the connection unit; and
- a transmission control unit configured to control transmission of the information generated by the generation unit to the information processing apparatus via the connection unit, in response to a request from the information processing apparatus,
- wherein, in the reproduction mode, the file stored in the storage medium is reproduced using at least a portion of the entry information of the file stored in the storage medium, and
- wherein the cache memory caches the entry information in accordance with the communication apparatus being activated in the reproduction mode.

* * * * *